United States Patent
Mukae

(10) Patent No.: US 12,365,487 B2
(45) Date of Patent: Jul. 22, 2025

(54) SPACE INFORMATION RECORDER, DANGER ANALYSIS SYSTEM, DANGER ANALYSIS METHOD, MEGA-CONSTELLATION BUSINESS DEVICE, SSA BUSINESS DEVICE, ROCKET LAUNCH BUSINESS DEVICE, SATELLITE BUSINESS DEVICE, DEBRIS REMOVAL BUSINESS DEVICE, ORBITAL TRANSFER BUSINESS DEVICE, AND OADR

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 174 days.

(21) Appl. No.: 17/917,557

(22) PCT Filed: May 7, 2021

(86) PCT No.: PCT/JP2021/017580
§ 371 (c)(1),
(2) Date: Oct. 7, 2022

(87) PCT Pub. No.: WO2021/230166
PCT Pub. Date: Nov. 18, 2021

(65) Prior Publication Data
US 2023/0143237 A1   May 11, 2023

(30) Foreign Application Priority Data
May 12, 2020  (JP) .................... 2020-084111

(51) Int. Cl.
*B64G 1/10*  (2006.01)
*B64G 1/24*  (2006.01)

(52) U.S. Cl.
CPC ............. *B64G 1/1085* (2013.01); *B64G 1/24* (2013.01); *B64G 1/2427* (2023.08); *B64G 1/2429* (2023.08)

(58) Field of Classification Search
CPC ...... B64G 1/1085; B64G 1/24; B64G 1/2427; B64G 1/2429; B64G 3/00
See application file for complete search history.

(56) References Cited

U.S. PATENT DOCUMENTS 11,780,612 B1 * 10/2023 Kopardekar ............. B64G 1/14
701/13
2016/0188176 A1   6/2016 Runnels
2018/0370658 A1  12/2018 Amimoto et al.

FOREIGN PATENT DOCUMENTS

| EP | 4 119 449 A1 | 1/2023 |
| JP | 2017-114159 A | 6/2017 |
| WO | WO-2020158001 A1 * | 8/2020 |

OTHER PUBLICATIONS

Extended European Search Report issued Sep. 18, 2023, in corresponding European Application No. 21803886.7, 10pp.

(Continued)

*Primary Examiner* — Jason Holloway
*Assistant Examiner* — Elizabeth Rose Neleski
(74) *Attorney, Agent, or Firm* — XSENSUS LLP

(57) ABSTRACT

A space information recorder (100) includes two or more categories of a category, acquired from a mega-constellation business device, of different constellations formed at nearby altitudes by the same business operator, a category of a satellite group of each constellation that flies at the same nominal altitude and cooperatively realizes the same mission, a category of orbital planes, a category of each orbital plane of the orbital planes, and a category of an individual satellite. The space information recorder (100) includes information on upper and lower limit values of an orbital (Continued)

300: SATELLITE GROUP
20: SATELLITE CONSTELLATION
70: EARTH altitude or on a nominal altitude and an altitude fluctuation width for each category.

21 Claims, 26 Drawing Sheets

(56) References Cited

OTHER PUBLICATIONS

Asgarimehr Milad et al: "GPS radio occultation constellation design with the optimal performance in Asia Pacific region", Journal of Geodesy, Springer Berlin Heidelberg, Berlin/Heidelberg, vol. 89, No. 6, Feb. 27, 2015 (Feb. 27, 2015), pp. 519-536, XP035498857, ISSN: 0949-7714, DOI: 10.1007/S00190-015-0795-3 [retrieved on Feb. 27, 2015], 18pp.
International Search Report and Written Opinion mailed on Jul. 20, 2021, received for PCT Application PCT/JP2021/017580, filed on May 7, 2021, 10 pages including English Translation.
Office Action dated Mar. 11, 2025 for corresponding EP application No. 21803886.7.

\* cited by examiner

Fig. 11

51: ORBIT FORECAST INFORMATION
- 511: SPACE OBJECT ID
- 512: FORECAST EPOCH
- 513: FORECAST ORBITAL ELEMENTS
- 514: FORECAST ERROR
- 52: SATELLITE ORBIT FORECAST INFORMATION
- 53: DEBRIS ORBIT FORECAST INFORMATION

| SATELLITE ID | DEBRIS ID | EPOCH | SIX KEPLERIAN ELEMENTS ||||||| PREDICTED ERROR |||
|---|---|---|---|---|---|---|---|---|---|---|---|
| | | | MEAN MOTION | ECCENTRICITY | INCLINATION | RAAN | ARGUMENT OF PERIGEE | MEAN ANOMALY | TRAVELING DIRECTION | ORTHOGONAL DIRECTION | BASIS |
| | | Year and date | Orbits /day | No unit | deg | deg | deg | deg | km | km | |
| A | | a1 | a2 | a3 | a4 | a5 | a6 | a7 | a8 | a9 | IN-ORBIT MEASUREMENT |
| B | | b1 | b2 | b3 | b4 | b5 | b6 | b7 | b8 | b9 | IN-ORBIT MEASUREMENT |
| C | | c1 | c2 | c3 | c4 | c5 | c6 | c7 | c8 | c9 | ANALYSIS |
| D | | d1 | d2 | d3 | d4 | d5 | d6 | d7 | d8 | d9 | GROUND MEASUREMENT |
| E | | e1 | e2 | e3 | e4 | e5 | e6 | e7 | e8 | e9 | GROUND MEASUREMENT |
| F | | f1 | f2 | f3 | f4 | f5 | f6 | f7 | f8 | f9 | SSA MEASUREMENT |
| | A | α1 | α2 | α3 | α4 | α5 | α6 | α7 | α8 | α9 | SSA MEASUREMENT |
| | B | β1 | β2 | β3 | β4 | β5 | β6 | β7 | β8 | β9 | SSA MEASUREMENT |
| | Γ | γ1 | γ2 | γ3 | γ4 | γ5 | γ6 | γ7 | γ8 | γ9 | SSA MEASUREMENT |
| | Δ | δ1 | δ2 | δ3 | δ4 | δ5 | δ6 | δ7 | δ8 | δ9 | SSA MEASUREMENT |

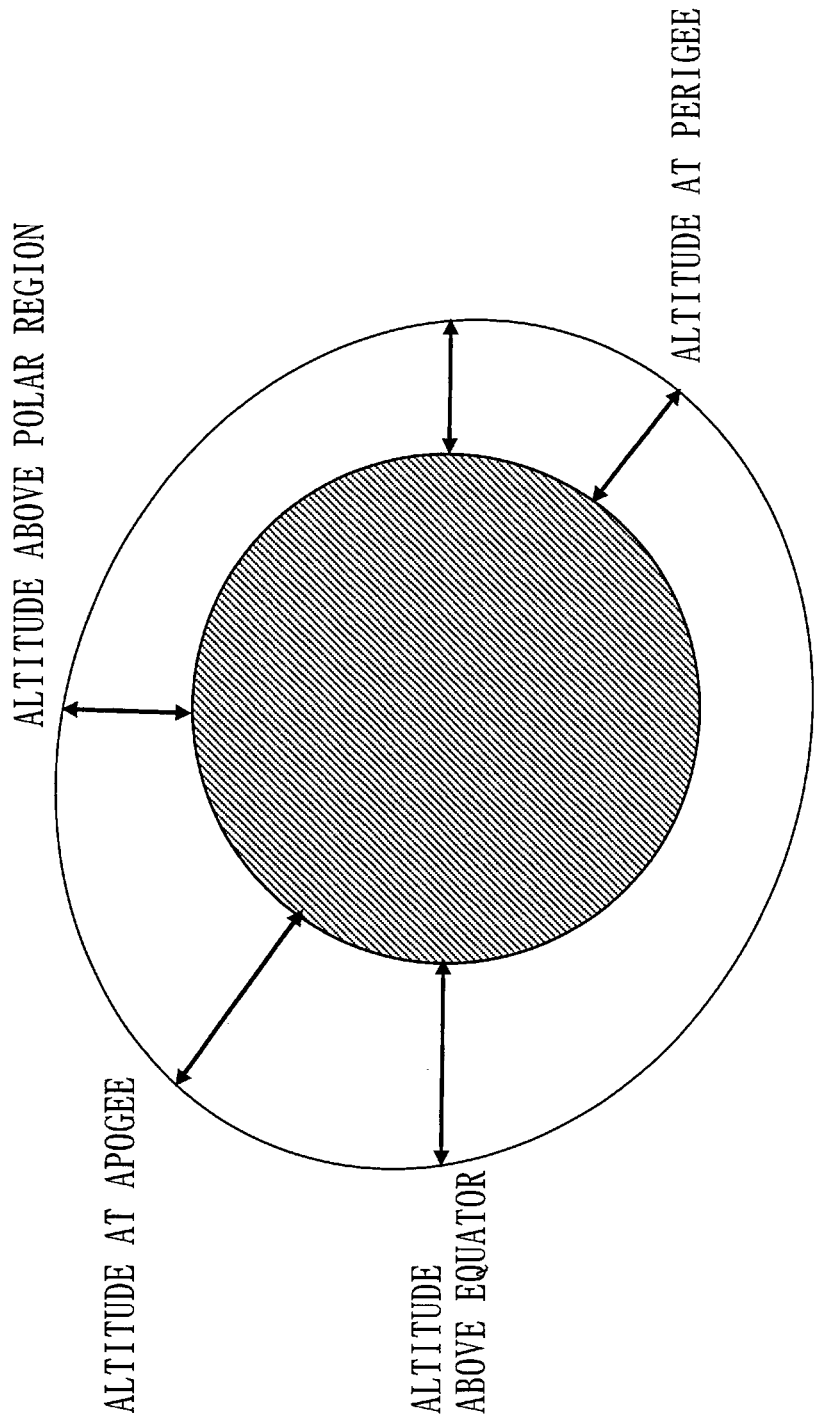

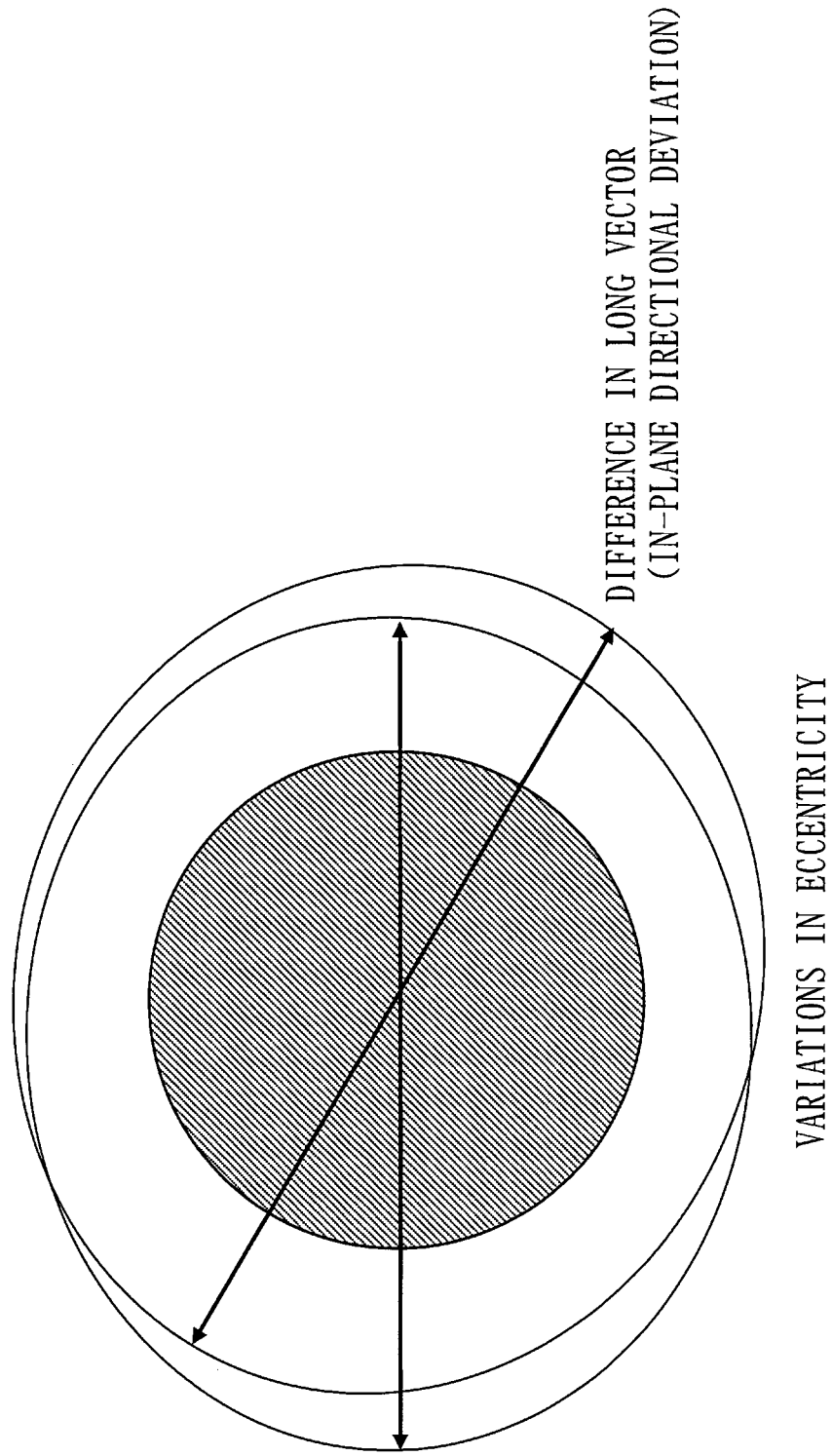

Fig. 16
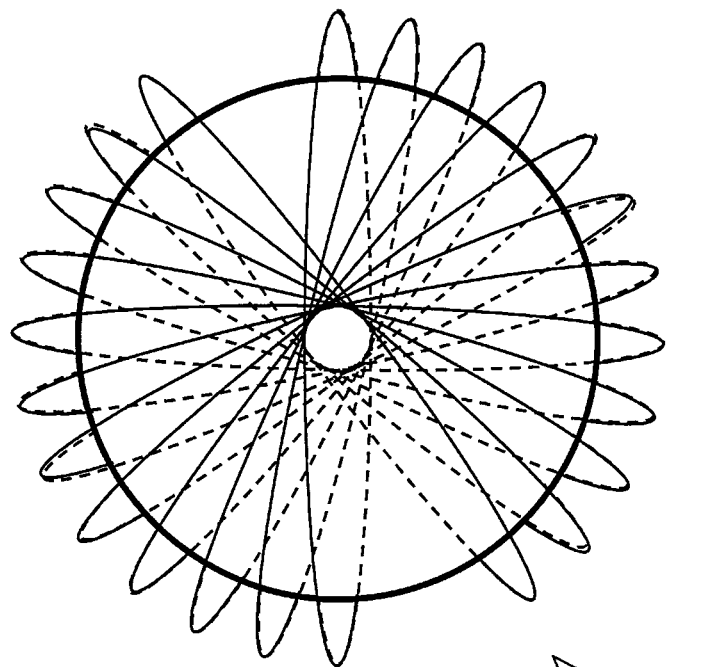
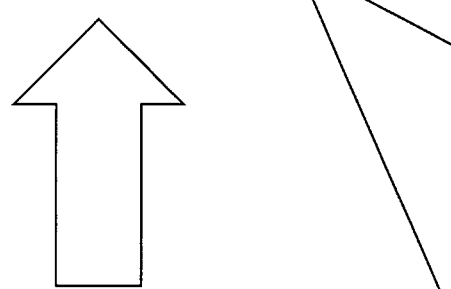
EXAMPLE IN WHICH ALTITUDE IS CHANGED FOR EACH ORBITAL PLANE AND RELATIVE AZIMUTH ANGLE OF ORBITAL PLANES CHANGES OVER TIME
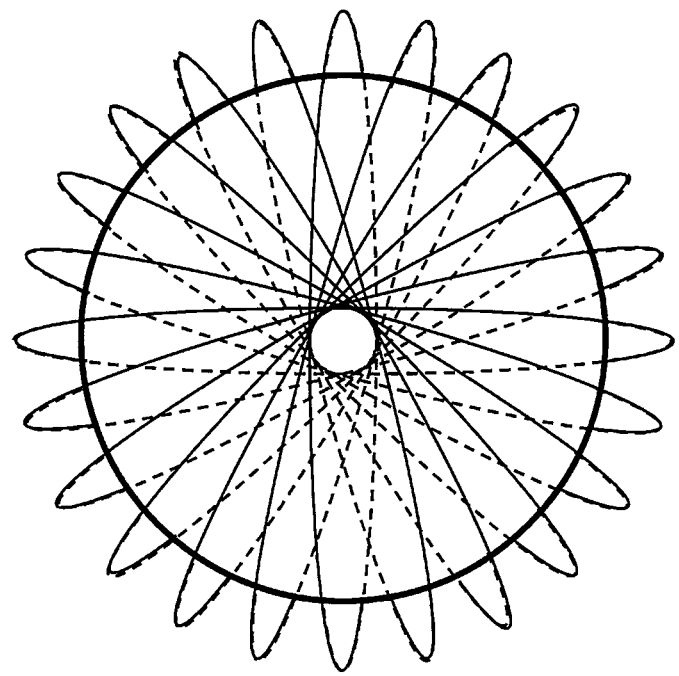

Fig.17

<FIRST PHASE>

ORBITAL PLANES : 24
ORBITAL INCLINATION : 53°
SATELLITES PER ORBITAL PLANE : 66
ORBITAL ALTITUDE : 550 km
NUMBER OF SATELLITES : 1584

ORBITAL PLANE : 32
ORBITAL INCLINATION : 53°
SATELLITES PER ORBITAL PLANE : 50
ORBITAL ALTITUDE : 1150 km
NUMBER OF SATELLITES : 1600

<SECOND PHASE>

ORBITAL INCLINATION : 42°
ORBITAL ALTITUDE : 335.9 km
NUMBER OF SATELLITES : 2493

ORBITAL INCLINATION : 48°
ORBITAL ALTITUDE : 340.8 km
NUMBER OF SATELLITES : 2478

ORBITAL INCLINATION : 53°
ORBITAL ALTITUDE : 345.6 km
NUMBER OF SATELLITES : 2547

Fig. 18

| CONSTELLATIONS OF MULTIPLE BUSINESS OPERATORS 601 | | | | | | | | | | | | | | |
|---|---|---|---|---|---|---|---|---|---|---|---|---|---|---|
| CONSTELLATIONS OF SAME BUSINESS OPERATOR 602 | | | | | | | | | | | | | | |
| | DIFFERENT CONSTELLATIONS OF SAME BUSINESS OPERATOR AT NEARBY ALTITUDES 603 | | | | | | | | | | | | | |
| | | CONSTELLATIONS AT SAME ALTITUDE (NOMINAL) 502 | | | | | SATELLITE GROUP (SYSTEM OPERATION) 603 | | | | CONSTELLATION GROUP (SYSTEM OPERATION) 504 | | | |
| | | | ORBITAL PLANE 501 | | | | VARIATIONS IN SATELLITE GROUP (MULTIPLE ORBITAL PLANES) | | | FLUCTUATION IN SYSTEM OPERATION ± (km) | VARIATIONS IN CONSTELLATION GROUP | | | FLUCTUATION IN SYSTEM OPERATION ± (km) |
| | | | 606 | VARIATIONS IN INDIVIDUAL SATELLITES | ORBITAL PLANE ID | NOMINAL (km) | ± (km) | CONSTELLATION ID | NOMINAL (km) | ± (km) | | CONSTELLATION GROUP ID | NOMINAL (km) | ± (km) |
| BUSINESS OPERATOR A | CONSTELLATION 340 | 605 | ORBITAL PLANE A | VARIATIONS IN INDIVIDUAL SATELLITES | Pa | Hpa | Δpa | Ca | HCa | ΔCa | ΔC0a | C340 | HC340a | ΔC340a | ΔC3400a |
| | | CONSTELLATION A | ORBITAL PLANE B | VARIATIONS IN INDIVIDUAL SATELLITES | Pb | Hpb | Δpb | | | | | | | | |
| | | | ORBITAL PLANE C | VARIATIONS IN INDIVIDUAL SATELLITES | Pc | Hpc | Δpc | | | | | | | | |
| | | | ... | | | | | | | | | | | | |
| | | CONSTELLATION B | ORBITAL PLANE A | VARIATIONS IN INDIVIDUAL SATELLITES | Pa | Hpa | Δpa | Cb | HCb | ΔCb | ΔC0b | | | | |
| | | | ORBITAL PLANE B | VARIATIONS IN INDIVIDUAL SATELLITES | Pb | Hpb | Δpb | | | | | | | | |
| | | | ORBITAL PLANE C | VARIATIONS IN INDIVIDUAL SATELLITES | Pc | Hpc | Δpc | | | | | | | | |
| | | | ... | | | | | | | | | | | | |
| | | CONSTELLATION C | ORBITAL PLANE A | VARIATIONS IN INDIVIDUAL SATELLITES | Pa | Hpa | Δpa | Cc | HCc | ΔCc | ΔC0c | | | | |
| | | | ORBITAL PLANE B | VARIATIONS IN INDIVIDUAL SATELLITES | Pb | Hpb | Δpb | | | | | | | | |
| | | | ORBITAL PLANE C | VARIATIONS IN INDIVIDUAL SATELLITES | Pc | Hpc | Δpc | | | | | | | | |
| | | | ... | | | | | | | | | | | | |
| | CONSTELLATION 550 | ORBITAL PLANE : 24 SATELLITES PER ORBITAL PLANE : 66 NUMBER OF SATELLITES : 1584 ORBITAL INCLINATION : 53° ORBITAL ALTITUDE : 550km | | | | | | | | | | | | |
| | CONSTELLATION 1150 | ORBITAL PLANE : 32 SATELLITES PER ORBITAL PLANE : 50 NUMBER OF SATELLITES : 1600 ORBITAL INCLINATION : 53° ORBITAL ALTITUDE : 1150km | | | | | | | | | | | | |
| BUSINESS OPERATOR B | | | | | | | | | | | | | | |
| ... | | | | | | | | | | | | | | |

Fig.19

| 604 CONSTELLATION AT SAME ALTITUDE (NOMINAL) | | 501 VARIATIONS IN SATELLITE GROUP (SINGLE ORBITAL PLANE) | | | 503 SATELLITE GROUP (SYSTEM OPERATION) VARIATIONS IN SATELLITE GROUP (MULTIPLE ORBITAL PLANES) | | | 504 CONSTELLATION GROUP (SYSTEM OPERATION) VARIATIONS IN CONSTELLATION GROUP | | |
|---|---|---|---|---|---|---|---|---|---|---|
| 605 | 606 ORBITAL PLANE | VARIATIONS IN INDIVIDUAL SATELLITES | ORBITAL PLANE ID | NOMINAL (km) | ± (km) | CONSTELLATION ID | NOMINAL (km) | ± (km) | FLUCTUATION IN SYSTEM OPERATION ± (km) | CONSTELLATION ID | NOMINAL (km) | ± (km) | FLUCTUATION IN SYSTEM OPERATION ± (km) |

| CONSTELLATION | ORBITAL PLANE | VARIATIONS IN INDIVIDUAL SATELLITES | ORBITAL PLANE ID | NOMINAL (km) | ± (km) | CONSTELLATION ID | NOMINAL (km) | ± (km) | FLUCTUATION ± (km) | CONSTELLATION ID | NOMINAL (km) | ± (km) | FLUCTUATION ± (km) |
|---|---|---|---|---|---|---|---|---|---|---|---|---|---|
| CONSTELLATION A | ORBITAL PLANE A | VARIATIONS IN INDIVIDUAL SATELLITES | Pa | Hpa | Δpa | Ca | HCa | ΔCa | ΔC0a | C340 | HC340a | ΔC340a | ΔC340Oa |
| | ORBITAL PLANE B | VARIATIONS IN INDIVIDUAL SATELLITES | Pb | Hpb | Δpb | | | | | | | | |
| | ORBITAL PLANE C | VARIATIONS IN INDIVIDUAL SATELLITES | Pc | Hpc | Δpc | | | | | | | | |
| | ... | | | | | | | | | | | | |
| CONSTELLATION B | ORBITAL PLANE A | VARIATIONS IN INDIVIDUAL SATELLITES | Pa | Hpa | Δpa | Cb | HCb | ΔCb | ΔC0b | | | | |
| | ORBITAL PLANE B | VARIATIONS IN INDIVIDUAL SATELLITES | Pb | Hpb | Δpb | | | | | | | | |
| | ORBITAL PLANE C | VARIATIONS IN INDIVIDUAL SATELLITES | Pc | Hpc | Δpc | | | | | | | | |
| | ... | | | | | | | | | | | | |
| CONSTELLATION C | ORBITAL PLANE A | VARIATIONS IN INDIVIDUAL SATELLITES | Pa | Hpa | Δpa | Cc | HCc | ΔCc | ΔC0c | | | | |
| | ORBITAL PLANE B | VARIATIONS IN INDIVIDUAL SATELLITES | Pb | Hpb | Δpb | | | | | | | | |
| | ORBITAL PLANE C | VARIATIONS IN INDIVIDUAL SATELLITES | Pc | Hpc | Δpc | | | | | | | | |

USED FOR MACRO-DISCUSSION SUCH AS DISCUSSION ON OVERALL STM

USED BY SSA BUSINESS OPERATOR FOR DETECTING INTRUSION BY SPACE OBJECT INTO REGION CONGESTED WITH MEGA-CONSTELLATION SATELLITES

Fig. 20

| CONSTELLATIONS AT SAME ALTITUDE (NOMINAL) 604 | ORBITAL PLANE 605 | | VARIATIONS IN SATELLITE GROUP (SINGLE ORBITAL PLANE) 502 | | | SATELLITE GROUP (SYSTEM OPERATION) 503 | CONSTELLATION GROUP (SYSTEM OPERATION) 504 |
|---|---|---|---|---|---|---|---|
| | | 501 | ORBITAL PLANE ID | NOMINAL (km) | ± (km) | | |
| CONSTELLATION A<br><br>NOMINAL VALUES<br>ORBITAL INCLINATION: 42°<br>ORBITAL ALTITUDE: 335.9km<br>NUMBER OF SATELLITES: 2493 | ORBITAL PLANE A 606 | VARIATIONS IN INDIVIDUAL SATELLITES | Pa | Hpa | Δpa | USED TO CREATE LAUNCH PLAN BY ROCKET LAUNCH BUSINESS OPERATOR OR ORBITAL TRANSFER SATELLITE BUSINESS OPERATOR | |
| | ORBITAL PLANE B | VARIATIONS IN INDIVIDUAL SATELLITES | Pb | Hpb | Δpb | | |
| | ORBITAL PLANE C | VARIATIONS IN INDIVIDUAL SATELLITES | Pc | Hpc | Δpc | USED TO CREATE DEORBIT PLAN BY SATELLITE BUSINESS OPERATOR OR DEBRIS REMOVAL BUSINESS OPERATOR THAT PERFORMS PMD | |
| | ... | | | | | | |
| CONSTELLATION B<br><br>NOMINAL VALUES<br>ORBITAL INCLINATION: 48°<br>ORBITAL ALTITUDE: 340.8km<br>NUMBER OF SATELLITES: 2478 | ORBITAL PLANE A | VARIATIONS IN INDIVIDUAL SATELLITES | Pa | Hpa | Δpa | | |
| | ORBITAL PLANE B | VARIATIONS IN INDIVIDUAL SATELLITES | Pb | Hpb | Δpb | | |
| | ORBITAL PLANE C | VARIATIONS IN INDIVIDUAL SATELLITES | Pc | Hpc | Δpc | | |
| | ... | | | | | | |
| CONSTELLATION C<br><br>NOMINAL VALUES<br>ORBITAL INCLINATION: 53°<br>ORBITAL ALTITUDE: 345.6km<br>NUMBER OF SATELLITES: 2547 | ORBITAL PLANE A | VARIATIONS IN INDIVIDUAL SATELLITES | Pa | Hpa | Δpa | | |
| | ORBITAL PLANE B | VARIATIONS IN INDIVIDUAL SATELLITES | Pb | Hpb | Δpb | | |
| | ORBITAL PLANE C | VARIATIONS IN INDIVIDUAL SATELLITES | Pc | Hpc | Δpc | | |

SPACE INFORMATION RECORDER, DANGER ANALYSIS SYSTEM, DANGER ANALYSIS METHOD, MEGA-CONSTELLATION BUSINESS DEVICE, SSA BUSINESS DEVICE, ROCKET LAUNCH BUSINESS DEVICE, SATELLITE BUSINESS DEVICE, DEBRIS REMOVAL BUSINESS DEVICE, ORBITAL TRANSFER BUSINESS DEVICE, AND OADR

CROSS-REFERENCE TO RELATED APPLICATIONS

The present application is based on PCT filing PCT/JP2021/017580, filed May 7, 2021, which claims priority to JP 2020-084111, filed May 12, 2020, the entire contents of each are incorporated herein by reference.

TECHNICAL FIELD

The present disclosure relates to a space information recorder, a danger analysis system, a danger analysis method, a mega-constellation business device, an SSA business device, a rocket launch business device, a satellite business device, a debris removal business device, an orbital transfer business device, and an OADR.

BACKGROUND ART

In recent years, large-scale satellite constellations including several hundred to several thousand satellites, which are called mega-constellations, have started to be constructed, and the risk of collision between satellites in orbit is increasing. In addition, space debris such as an artificial satellite that has become uncontrollable due to a failure or rocket debris has been increasing.

With the rapid increase in space objects such as satellites and space debris in outer space as described above, in space traffic management (STM) there is an increasing need to create international rules for avoiding collisions between space objects.

Patent Literature 1 discloses a technology for forming a satellite constellation composed of a plurality of satellites in the same circular orbit.

There is so far a system in which the Combined Space Operations Center (CSpOC) in the United States continues to monitor space objects and issues an alert when a proximity or collision between space objects is foreseen. At a manned space station and in a commercial communications satellite, an avoidance operation is carried out in response to this alert when it is judged necessary.

CITATION LIST

Patent Literature

Patent Literature 1: JP 2017-114159 A

SUMMARY OF INVENTION

Technical Problem

With an increase in debris in outer space, an increase in the number of satellites due to the emergence of mega-constellations, and improvement in ground surveillance capability, it is becoming difficult to continue the existing alert issuance service by the CSpOC in the United States. Space situation awareness (SSA) is required to judge whether a space object will intrude into a satellite constellation.

In addition, there are management business operators that manage various space objects flying in space. These management business operators need to cooperate to analyze a proximity or collision between space objects.

However, Patent Literature 1 does not describe a system in which management business operators perform collision or proximity analysis while sharing orbit information of space objects.

An object of the present disclosure is to provide a system in which a satellite constellation business device that manages a satellite constellation performs proximity or collision danger analysis while sharing orbit information with management business devices.

Solution to Problem

A space information recorder according to the present disclosure acquires orbit forecast information from a management business device that is used by a management business operator that manages a plurality of space objects flying in space, and records the orbit forecast information, the orbit forecast information is forecast values of orbits of the plurality of space objects, and the space information recorder includes two or more categories of
a category, acquired from a mega-constellation business device, of different constellations formed at nearby altitudes by a same business operator, the mega-constellation business device being a management business device of a satellite group constituting a mega-constellation composed of 100 or more satellites;
a category of a satellite group of each constellation that flies at a same nominal altitude and cooperatively realizes a same mission;
a category of orbital planes;
a category of each orbital plane of the orbital planes; and
a category of an individual satellite,
wherein the space information recorder includes information on upper and lower limit values of an orbital altitude or on a nominal altitude and an altitude fluctuation width for each category.

Advantageous Effects of Invention

With a space information recorder according to the present disclosure, there is an effect that a satellite constellation business device that manages a satellite constellation can perform proximity or collision danger analysis while sharing orbit information with management business devices.

BRIEF DESCRIPTION OF DRAWINGS

FIG. 11 is an example of orbit forecast information included in a space information recorder according to Embodiment 1;

FIG. 12 is a diagram illustrating fluctuations in orbital altitude in a category of an individual satellite in a steady operation phase in a satellite constellation;

FIG. 13 is a diagram illustrating variations in orbital plane shape in a category of the same orbital plane in a constellation satellite group that realizes a single mission at the same altitude (nominal);

FIG. 16 is a diagram illustrating a change of altitudes in a category of a constellation satellite group;

FIG. 17 is a diagram illustrating an example of a category of different constellation satellite groups of the same business operator at nearby altitudes;

FIG. 18 is an example of a configuration and a usage pattern of orbital altitude information for each category included in the space information recorder according to Embodiment 1;

FIG. 19 is an example of a configuration and a usage pattern of orbital altitude information for each category included in the space information recorder according to Embodiment 1;

FIG. 20 is an example of a configuration and a usage pattern of orbital altitude information for each category included in the space information recorder according to Embodiment 1;

DESCRIPTION OF EMBODIMENTS

Figure 1:
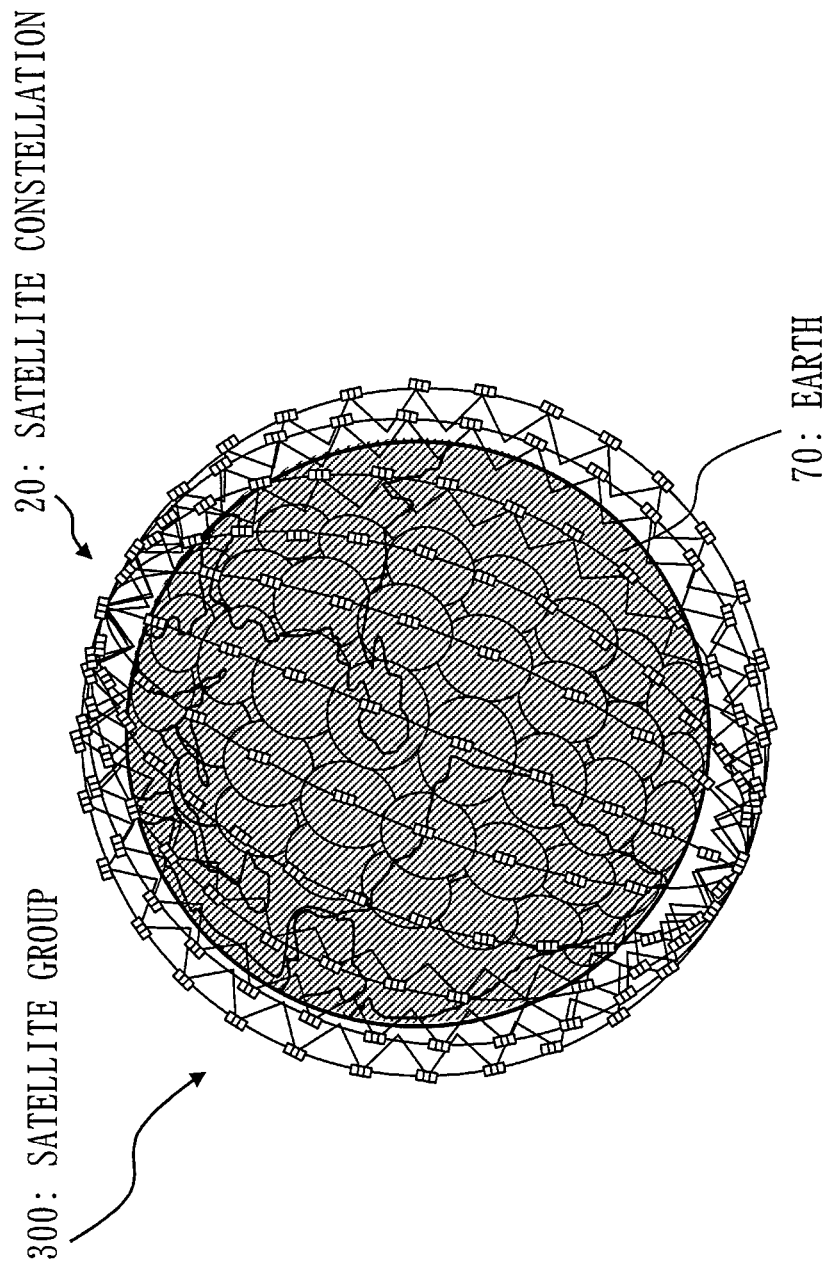
FIG. 1 is an example in which a plurality of satellites cooperatively realize a communication service to the ground over the entire globe of Earth.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified.

In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

Examples of a satellite constellation assumed for a space information recorder according to the following embodiments will be described.

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner. By providing adjacent orbital planes, a communication service can be provided to the ground with widespread coverage across the adjacent orbits. Similarly, by placing a large number of orbital planes at approximately equal intervals around Earth, a communication service to the ground can be provided over the entire globe.

Figure 2:
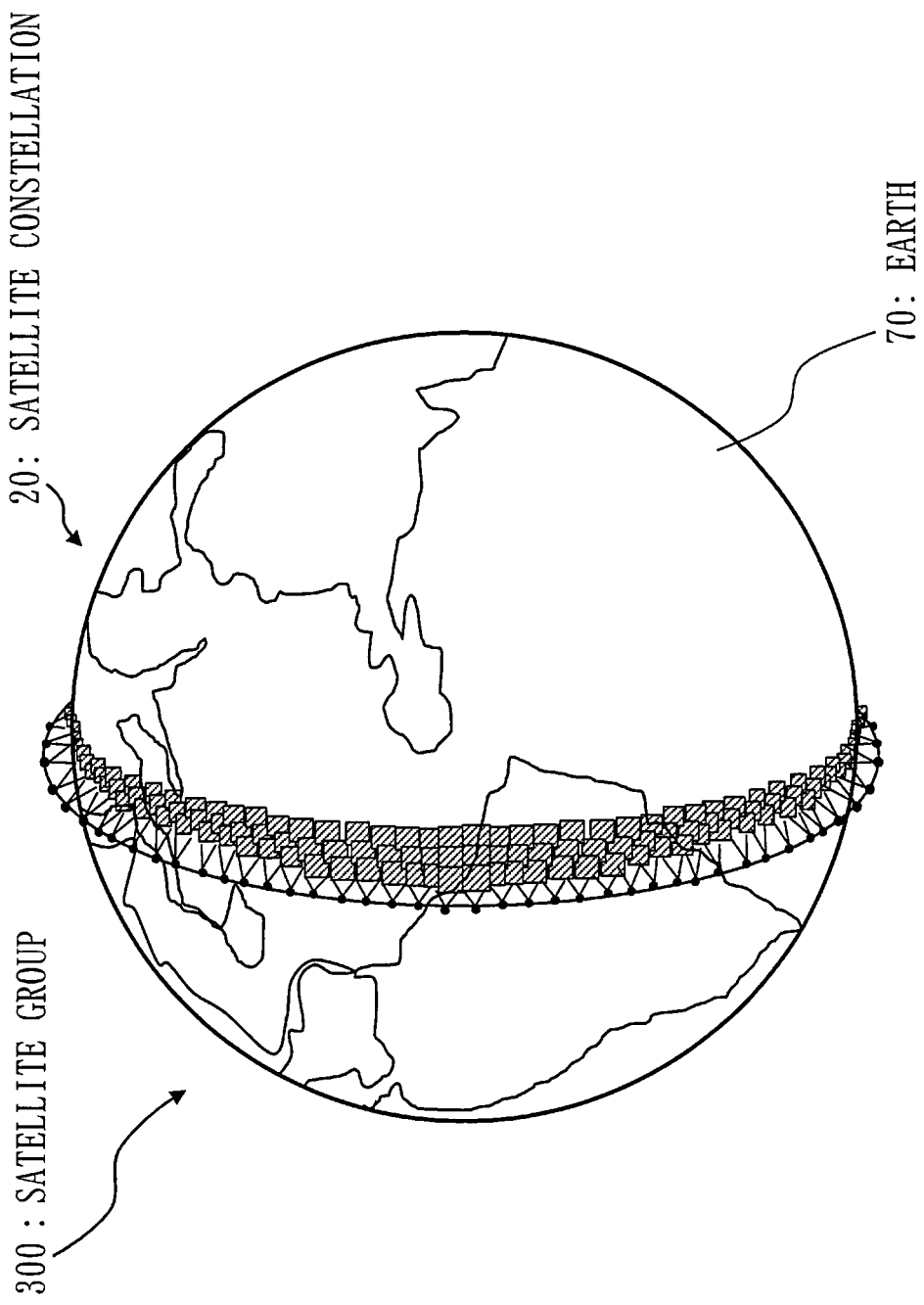
FIG. 2 is an example in which a plurality of satellites in a single orbital plane realize an Earth observation service.

FIG. 2 is a diagram illustrating an example in which a plurality of satellites in a single orbital plane realize an Earth observation service.

FIG. 2 illustrates a satellite constellation 20 that realizes an Earth observation service. In the satellite constellation 20 of FIG. 2, satellites each equipped with an Earth observation device, which is an optical sensor or a radio sensor such as a synthetic-aperture radar, fly at the same altitude in the same orbital plane. In this way, in a satellite group 300 in which the ground imaging ranges of successive satellites overlap in a time-delay manner, a plurality of satellites in orbit provide an Earth observation service by capturing ground images in turn in a time-division manner.

As described above, the satellite constellation 20 is formed with the satellite group 300 composed of a plurality of satellites in each orbital plane. In the satellite constellation 20, the satellite group 300 cooperatively provides a service. Specifically, the satellite constellation 20 refers to a satellite constellation formed with one satellite group by a communications business service company as illustrated in FIG. 1 or an observation business service company as illustrated in FIG. 2.

Figure 3:
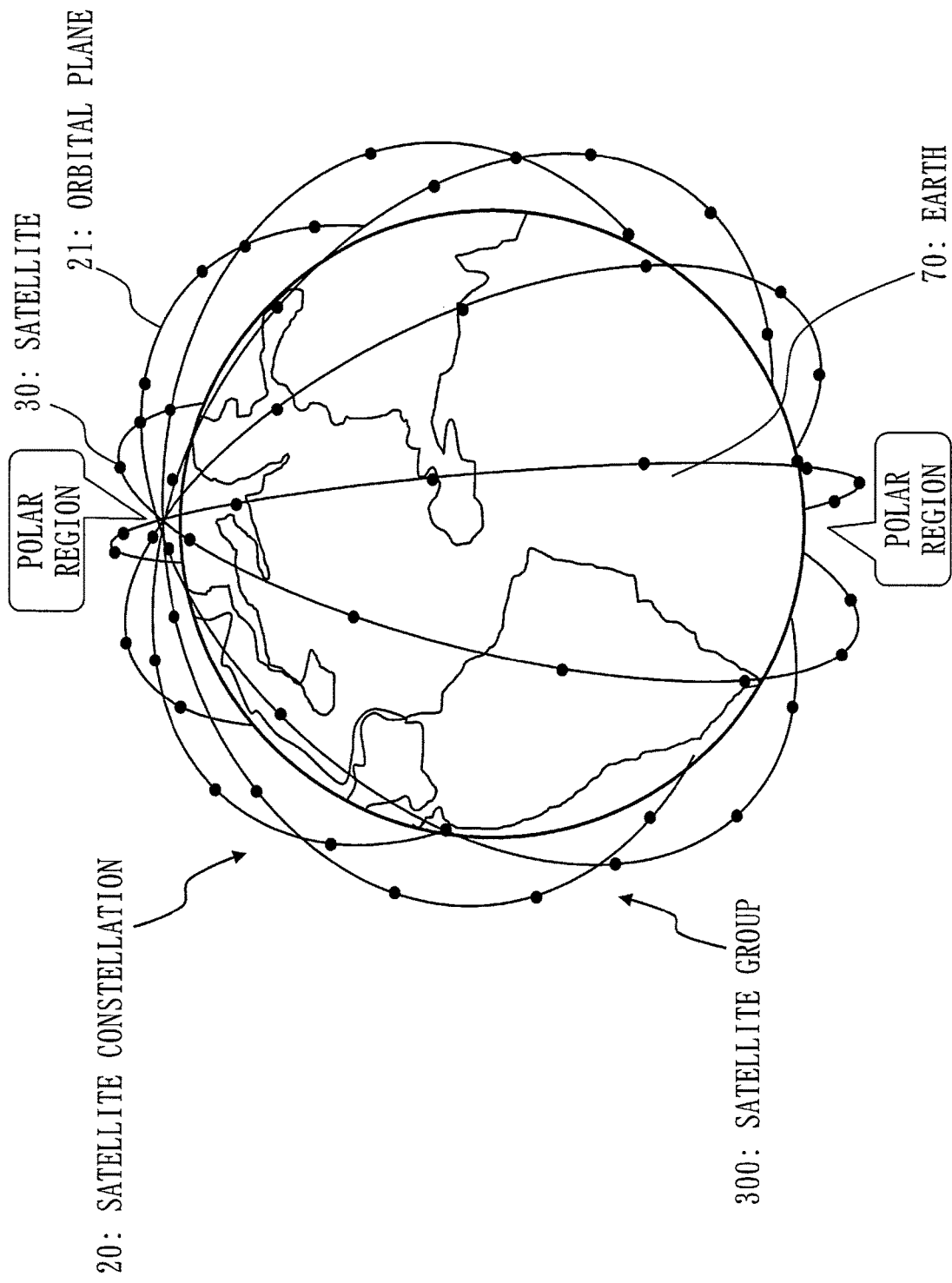
FIG. 3 is an example of a satellite constellation having a plurality of orbital planes that intersect in the vicinity of the polar regions.
Figure 4:
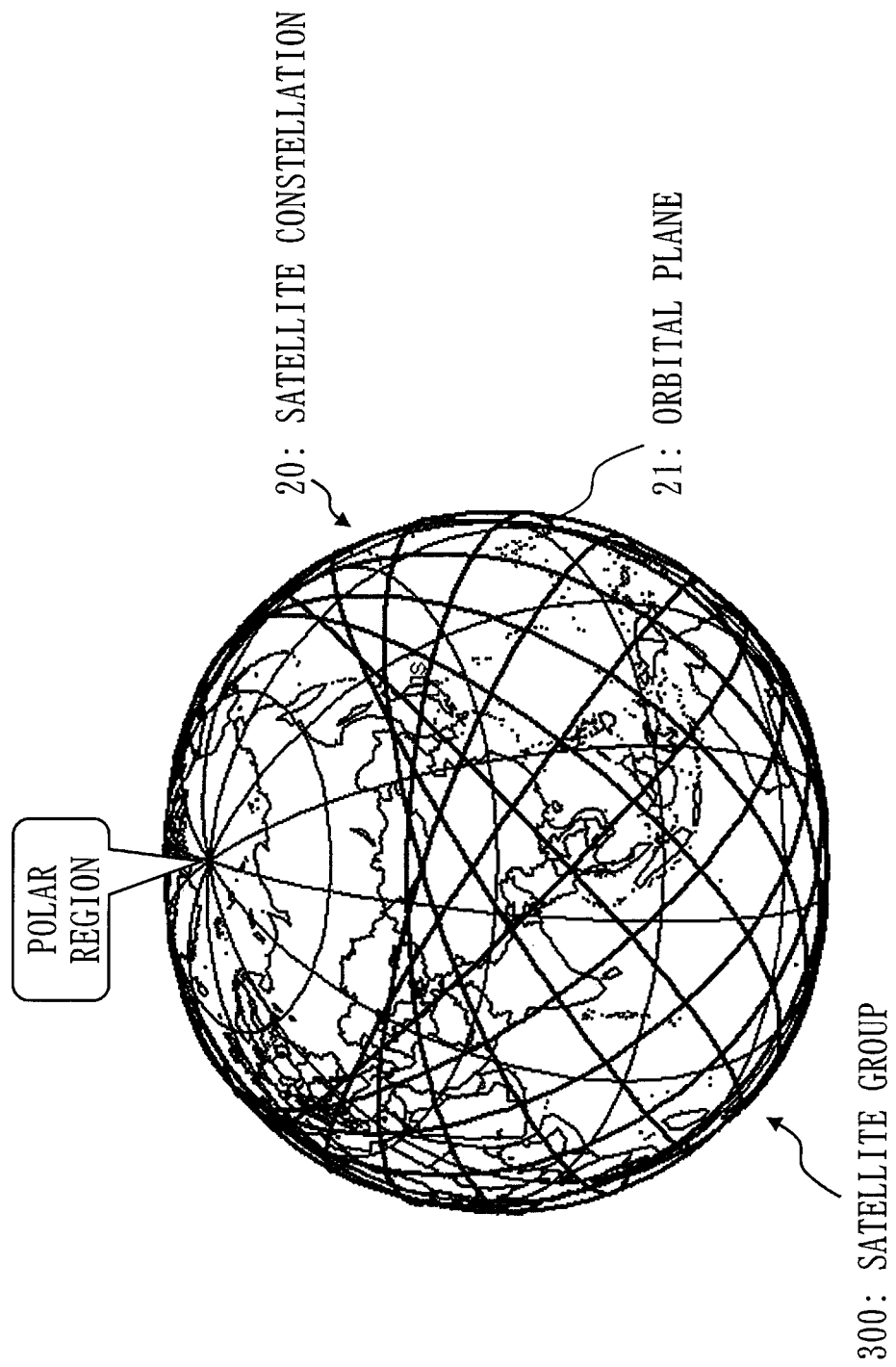
FIG. 4 is an example of a satellite constellation having a plurality of orbital planes that intersect outside the polar regions.

FIG. 3 is an example of a satellite constellation 20 having a plurality of orbital planes 21 that intersect in the vicinity of the polar regions. FIG. 4 is an example of a satellite constellation 20 having a plurality of orbital planes 21 that intersect outside the polar regions.

In the satellite constellation 20 of FIG. 3, the orbital inclination of each of the plurality of orbital planes 21 is about 90 degrees, and the orbital planes 21 exist on mutually different planes.

In the satellite constellation 20 of FIG. 4, the orbital inclination of each of the plurality of orbital planes 21 is not about 90 degrees, and the orbital planes 21 exist on mutually different planes.

In the satellite constellation 20 of FIG. 3, any given two orbital planes intersect at points in the vicinity of the polar regions. In the satellite constellation 20 of FIG. 4, any given two orbital planes intersect at points outside the polar regions. In FIG. 3, a collision between satellites 30 may occur in the vicinity of the polar regions. As illustrated in FIG. 4, the intersections between the orbital planes each with an orbital inclination greater than 90 degrees move away from the polar regions according to the orbital inclination. Depending on the combinations of orbital planes, orbital planes may intersect at various locations including the vicinity of the equator. For this reason, places where collisions between satellites 30 may occur are diversified. A satellite 30 is referred to also as an artificial satellite.

In particular, in recent years, large-scale satellite constellations including several hundred to several thousand satellites have started to be constructed, and the risk of collision between satellites in orbit is increasing. In addition, space debris such as an artificial satellite that has become uncontrollable due to a failure or rocket debris has been increasing. A large-scale satellite constellation composed of 100 or more satellite is referred to also as a mega-constellation. Such debris is referred to also as space debris.

As described above, with the increase in debris in outer space and the rapid increase in the number of satellites such as those in a mega-constellation, the need for space traffic management (STM) is increasing.

Due to the increase in debris in outer space, a dramatic increase in the total number of objects in outer space due to the emergence of mega-constellation business operators, and a dramatic increase in the amount of information due to the improvement in surveillance capability for objects in orbit, it is difficult for a single business operator to perform proximity and collision analysis for space objects.

Satellites in steady operation control the orbit and attitude moment to moment. For this reason, in order to grasp orbit information with high precision, it is necessary to update information moment to moment. In particular, it is increasingly difficult to share quasi-real time information of a satellite group of several thousand satellites of a mega-constellation business operator among many business operators.

On the other hand, danger risks such as proximities and collisions between space objects are increasing.

Under such circumstances, it is hoped that a rational system will be created in which proximity and collision analysis including a mega-constellation satellite group is performed, and if danger is foreseen, detailed analysis can be performed.

In a mega-constellation composed of polar orbit satellites, there are congested regions in the polar regions and there is a collision risk within the system. In a mega-constellation composed of inclined orbit satellites, there are many intersections of orbital planes over the entire mid-latitude zone, so that there is a collision risk within the system. In order to eliminate this collision risk, it is effective to change the orbital altitude between orbital planes with different normal vectors. This is because space objects between which there is no intersection of orbits will not collide with each other.

When this collision avoidance measure is adopted, variations in the actual orbital altitude of the satellite group with respect to the nominal orbital altitude are large, so that proximity and collision analysis using only nominal orbital altitude information is insufficient. Means for providing and receiving orbit information that appropriately reflects differences in orbital altitude is indispensable.

In this embodiment, high-precision orbit information of individual satellites that is used for collision analysis by a mega-constellation business operator and orbit information that is used by other business operators are classified by category. A space information recorder that lists the upper and lower limit values for each category, focusing on orbital altitudes, is provided.

By selecting a category with an amount of information and precision that are appropriate for each purpose of a business operator, it is possible to rationally perform both proximity and collision analysis with coarse precision on a macro level and collision analysis with high precision when a collision is foreseen demonstrably.

Referring to FIGS. 5 to 8, an example of a satellite 30 and a ground facility 700 in a satellite constellation forming system 600 that forms a satellite constellation 20 will be described.

The satellite constellation forming system 600 is installed in a management business device 40 operated by a management business operator that manages a satellite constellation, such as a mega-constellation business device 41, an LEO constellation business device 42, or a satellite business device 43. LEO is an abbreviation for Low Earth Orbit.

A satellite control scheme by the satellite constellation forming system 600 is also applied to the management business device 40 that controls a satellite. Specifically, it may be installed on the management business device 40 such as a debris removal business device 45 that manages a debris removal satellite, a rocket launch business device 46 that launches a rocket, and an orbital transfer business device 44 that manages an orbital transfer satellite.

The satellite control scheme by the satellite constellation forming system 600 may be installed in any management business device, provided that it is a management business device of a business operator that manages a space object 60.

Each device of the management business device 40 will be described later.

Figure 5:
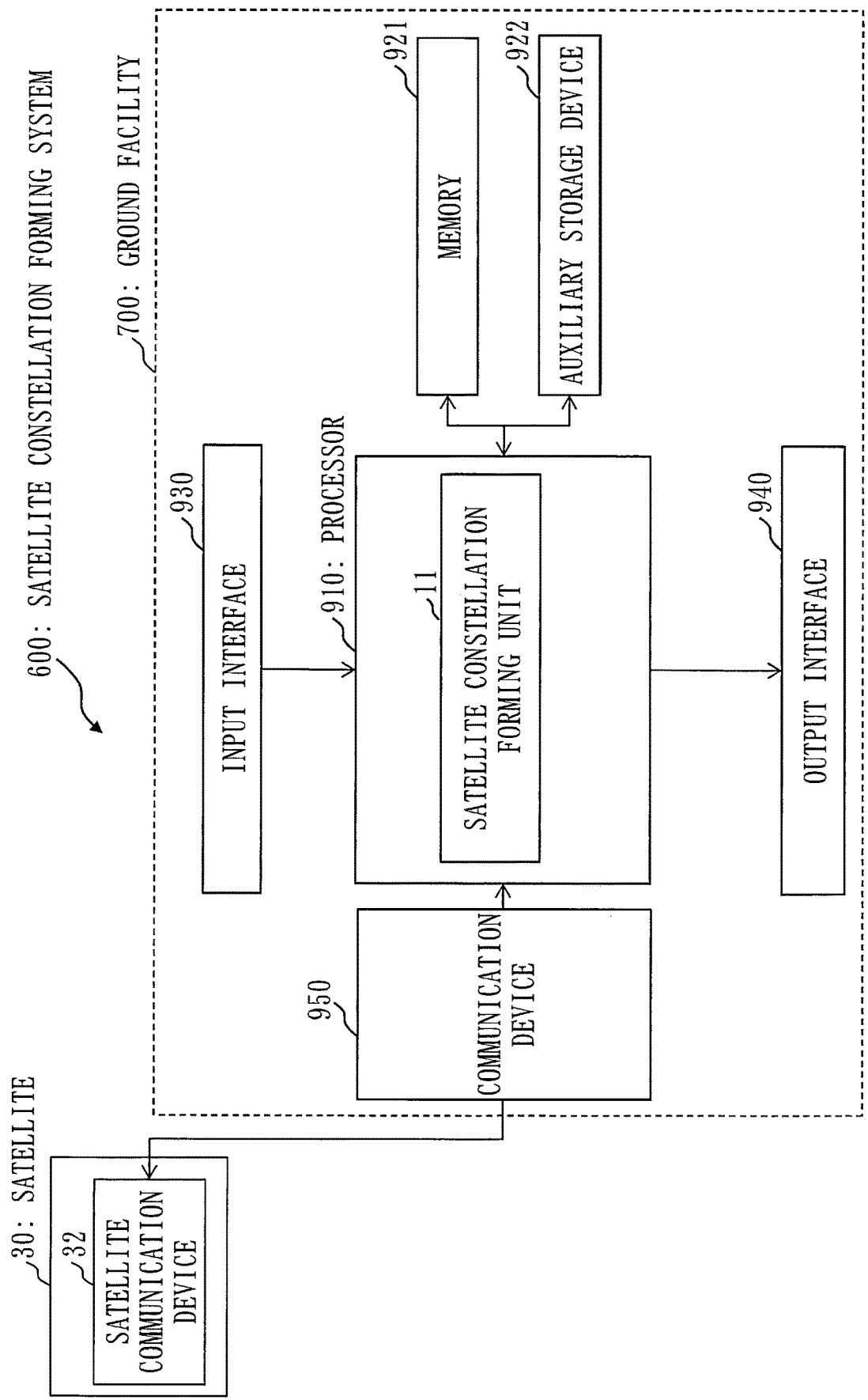
FIG. 5 is a configuration diagram of a satellite constellation forming system.

FIG. 5 is a configuration diagram of the satellite constellation forming system 600.

The satellite constellation forming system 600 includes a computer. FIG. 5 illustrates a configuration with one computer but, in practice, a computer is provided in each satellite 30 of a plurality of satellites constituting the satellite constellation 20 and the ground facility 700 that communicates with each satellite 30. The functions of the satellite constellation forming system 600 are realized cooperatively by the computers provided in each of the satellites 30 and the ground facility 700 that communicates with the satellites 30. In the following, an example of a configuration of the computer that realizes the functions of the satellite constellation forming system 600 will be described.

The satellite constellation forming system 600 includes the satellite 30 and the ground facility 700. The satellite 30 includes a satellite communication device 32 that communicates with a communication device 950 of the ground facility 700. Among the components included in the satellite 30, the satellite communication device 32 is illustrated in FIG. 5.

The satellite constellation forming system 600 includes a processor 910, and also includes other hardware components such as a memory 921, an auxiliary storage device 922, an input interface 930, an output interface 940, and a communication device 950. The processor 910 is connected with other hardware components via signal lines and controls these other hardware components. The hardware of the satellite constellation forming system 600 is substantially the same as the hardware of the ground facility 700 to be described later with reference to FIG. 8.

The satellite constellation forming system 600 includes a satellite constellation forming unit 11 as a functional element. The functions of the satellite constellation forming unit 11 are realized by hardware or software.

The satellite constellation forming unit 11 controls formation of the satellite constellation 20 while communicating with the satellite 30.

Figure 6:
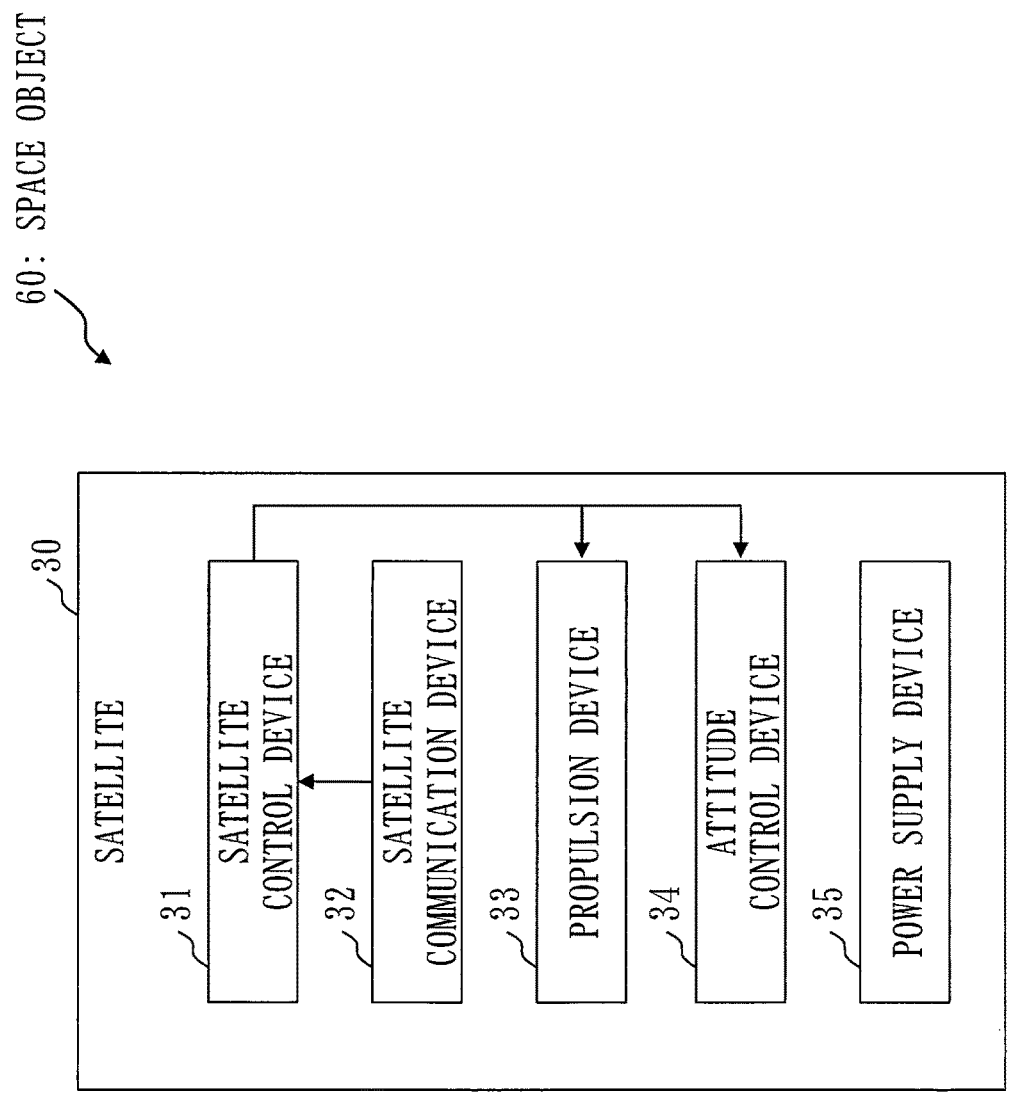
FIG. 6 is a configuration diagram of a satellite of the satellite constellation forming system.

FIG. 6 is a configuration diagram of the satellite 30 of the satellite constellation forming system 600.

The satellite 30 includes a satellite control device 31, the satellite communication device 32, a propulsion device 33, an attitude control device 34, and a power supply device 35. Although other constituent elements that realize various functions are included, the satellite control device 31, the satellite communication device 32, the propulsion device 33, the attitude control device 34, and the power supply device 35 will be described in FIG. 6. The satellite 30 is an example of a space object 60.

The satellite control device 31 is a computer that controls the propulsion device 33 and the attitude control device 34 and includes a processing circuit. Specifically, the satellite control device 31 controls the propulsion device 33 and the attitude control device 34 in accordance with various commands transmitted from the ground facility 700.

The satellite communication device 32 is a device that communicates with the ground facility 700. Specifically, the satellite communication device 32 transmits various types of data related to the satellite itself to the ground facility 700. The satellite communication device 32 also receives various commands transmitted from the ground facility 700.

The propulsion device 33 is a device that provides thrust force to the satellite 30 to change the velocity of the satellite 30. Specifically, the propulsion device 33 is an apogee kick motor, a chemical propulsion device, or an electronic propulsion device. The apogee kick motor (AKM) is an upper-stage propulsion device used for orbital insertion of an artificial satellite, and is also called an apogee motor (when a solid rocket motor is used) or an apogee engine (when a liquid engine is used).

The chemical propulsion device is a thruster using monopropellant or bipropellant fuel. The electronic propulsion device is an ion engine or a Hall thruster. The apogee kick motor is the name of a device used for orbital transfer and may be one type of chemical propulsion device.

The attitude control device 34 is a device to control the attitude of the satellite 30 and attitude elements, such as the angular velocity and the line of sight, of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator in accordance with measurement data of the attitude sensor or various commands from the ground facility 700.

The power supply device 35 includes equipment such as a solar cell, a battery, and an electric power control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

Figure 7:
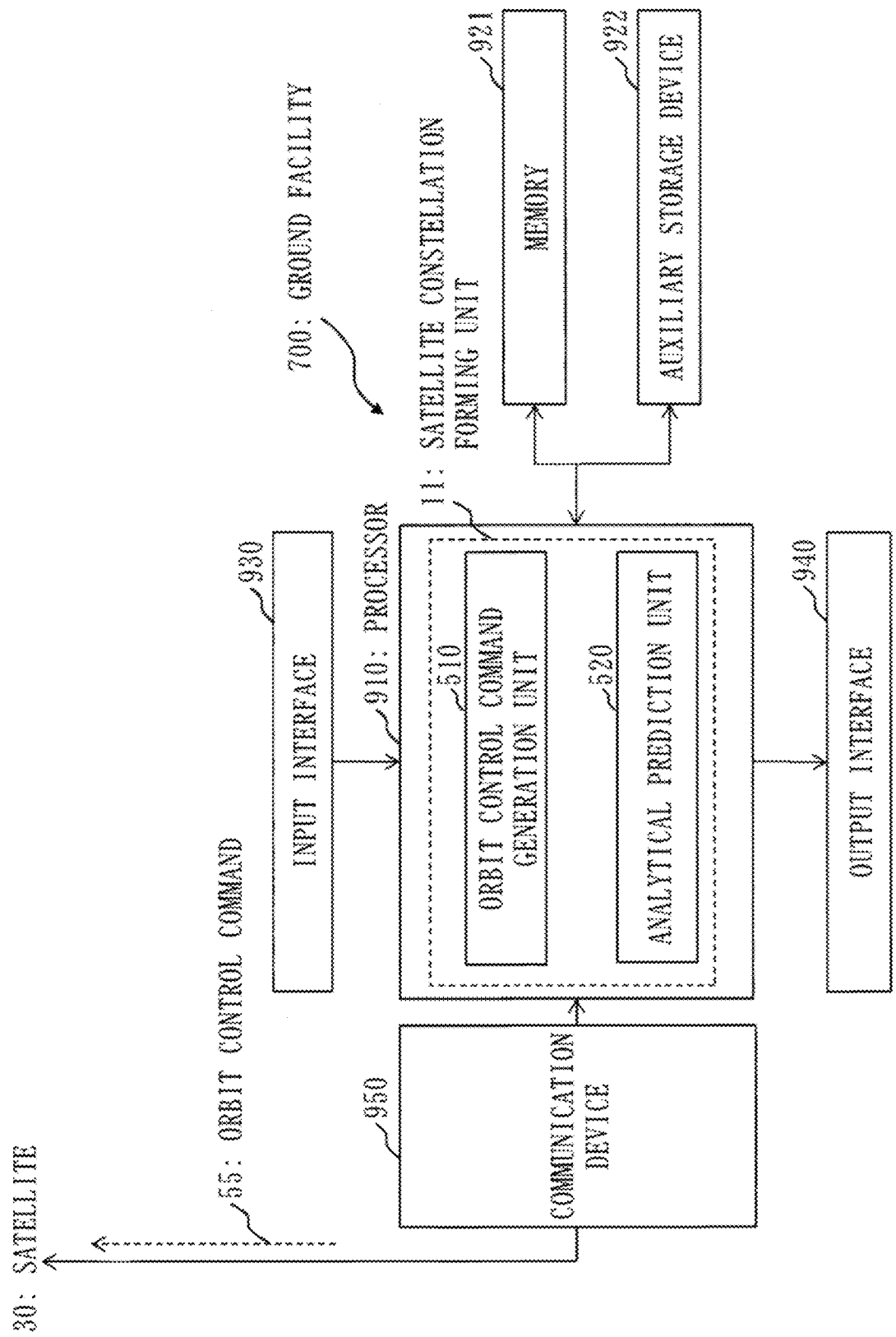
FIG. 7 is a configuration diagram of a ground facility of the satellite constellation forming system.

FIG. 7 is a configuration diagram of the ground facility 700 included in the satellite constellation forming system 600.

The ground facility 700 controls a large number of satellites in all orbital planes by programs. The ground facility 700 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed in a mobile object such as an airplane, a self-driving vehicle, or a mobile terminal.

The ground facility 700 forms the satellite constellation 20 by communicating with each satellite 30. The ground facility 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components. The hardware components of the ground facility 700 will be described later with reference to FIG. 8.

The ground facility 700 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 performs analytical prediction on the orbit of the satellite 30.

The orbit control command generation unit 510 generates an orbit control command 55 to be transmitted to the satellite 30.

The orbit control command generation unit 510 and the analytical prediction unit 520 realize the functions of the satellite constellation forming unit 11. That is, the orbit control command generation unit 510 and the analytical prediction unit 520 are examples of the satellite constellation forming unit 11.

Figure 8:
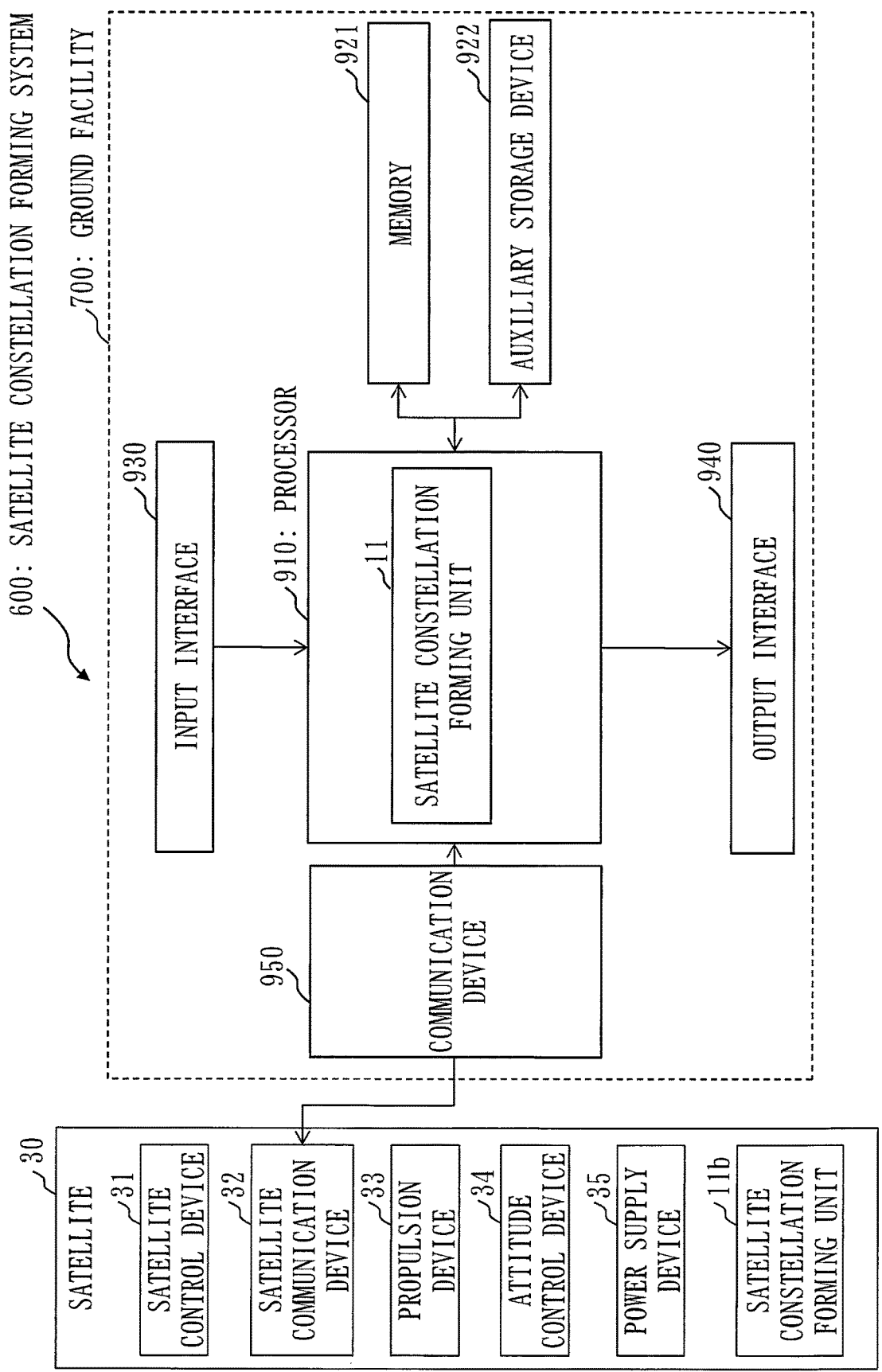
FIG. 8 is an example of a functional configuration of the satellite constellation forming system.

FIG. 8 is a diagram illustrating an example of a functional configuration of the satellite constellation forming system 600.

The satellite 30 further includes a satellite constellation forming unit 11b to form the satellite constellation 20. The functions of the satellite constellation forming system 600 are realized cooperatively by the satellite constellation forming unit 11b included in each satellite 30 of a plurality of satellites and the satellite constellation forming unit 11 included in the ground facility 700. The satellite constellation forming unit 11b of the satellite 30 may be included in the satellite control device 31.

The ground facility 700 includes the processor 910 and also includes other hardware components such as the memory 921, the auxiliary storage device 922, the input interface 930, the output interface 940, and the communication device 950. The processor 910 is connected with other hardware components via signal lines and controls these other hardware components.

The processor 910 is a device that executes programs. The programs are those that realize the functions of the ground facility 700. In FIG. 8, the program that realizes the functions of the ground facility 700 is a satellite constellation forming program to form a satellite constellation.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of a display device 941, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC).

The programs are read into the processor 910 and executed by the processor 910. The memory 921 stores not only the programs but also an operating system (OS). The processor 910 executes the programs while executing the OS. The programs and the OS may be stored in the auxiliary storage device 922. The programs and the OS that are stored in the auxiliary storage device 922 are loaded into the memory 921 and executed by the processor 910. Part or the entirety of each program may be embedded in the OS.

The ground facility 700 may include a plurality of processors as an alternative to the processor 910. These processors share the execution of programs. Each of the processors is, like the processor 910, a device that executes programs.

Data, information, signal values, and variable values that are used, processed, or output by programs are stored in the memory 921 or the auxiliary storage device 922, or stored in a register or a cache memory in the processor 910.

"Unit" of each unit of the ground facility 700 may be interpreted as "process", "procedure", "means", "phase", or "step". "Process" where "unit" of each unit is interpreted as "process" may be interpreted as "program", "program product", "computer readable recording medium recording a program", or "computer readable storage medium storing a program". The terms "process", "procedure", "means", "phase", and "step" can be interpreted interchangeably.

Each program causes a computer to execute each process, each procedure, each means, each phase, or each step, where "unit" of each unit of the ground facility 700 is interpreted as "process", "procedure", "means", "phase", or "step".

Each program may be stored and provided in a computer readable recording medium. Alternatively, each program may be provided as a program product.

* Description of Configurations *

Figure 9:
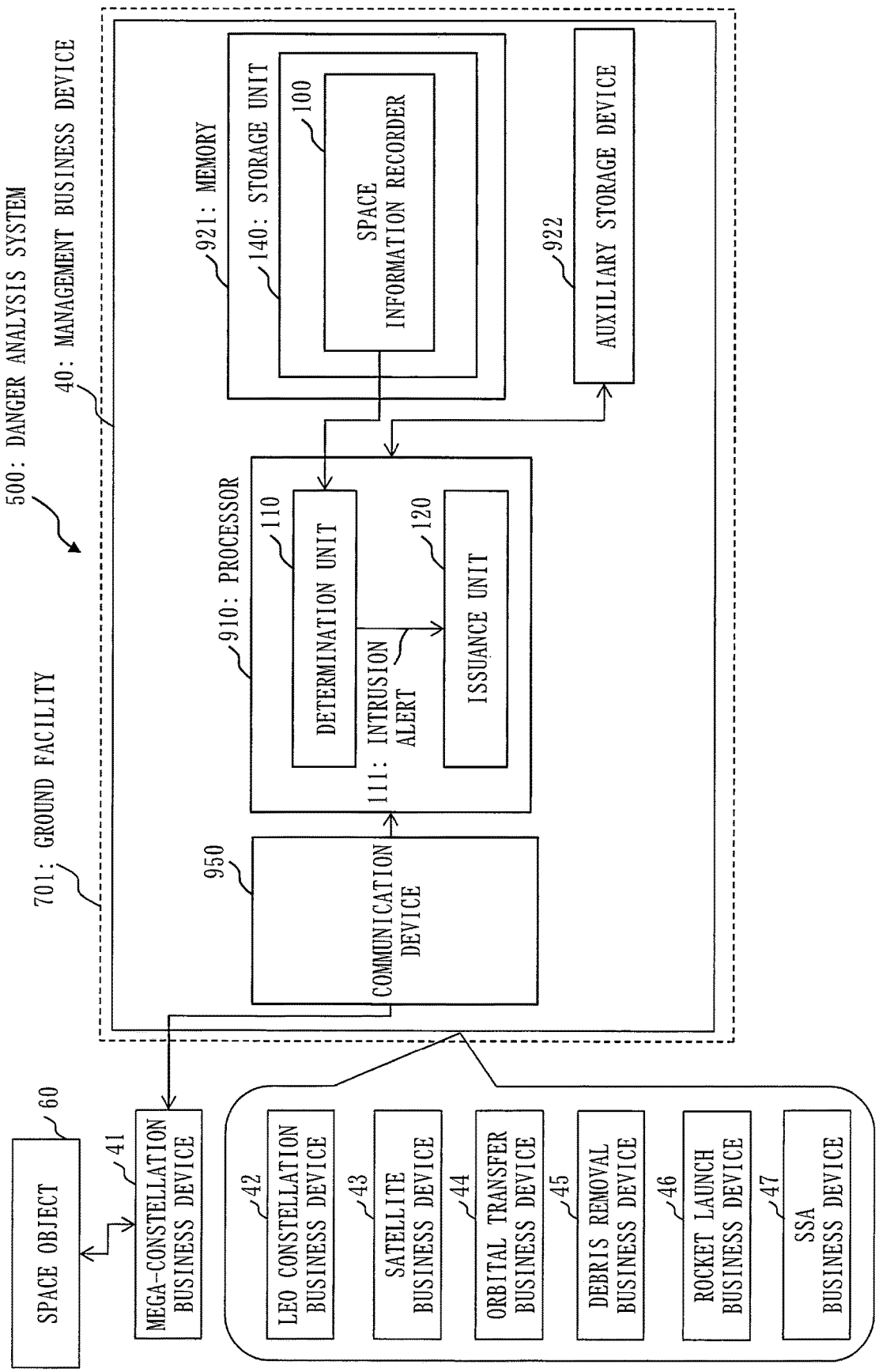
FIG. 9 is an example of a configuration of a management business device other than a mega-constellation business device in a danger analysis system according to Embodiment 1.

FIG. 9 is an example of a configuration of the management business device 40 in a danger analysis system 500 according to this embodiment. FIG. 9 illustrates an example of the configuration of the management business device 40 other than the mega-constellation business device 41.

Figure 10:
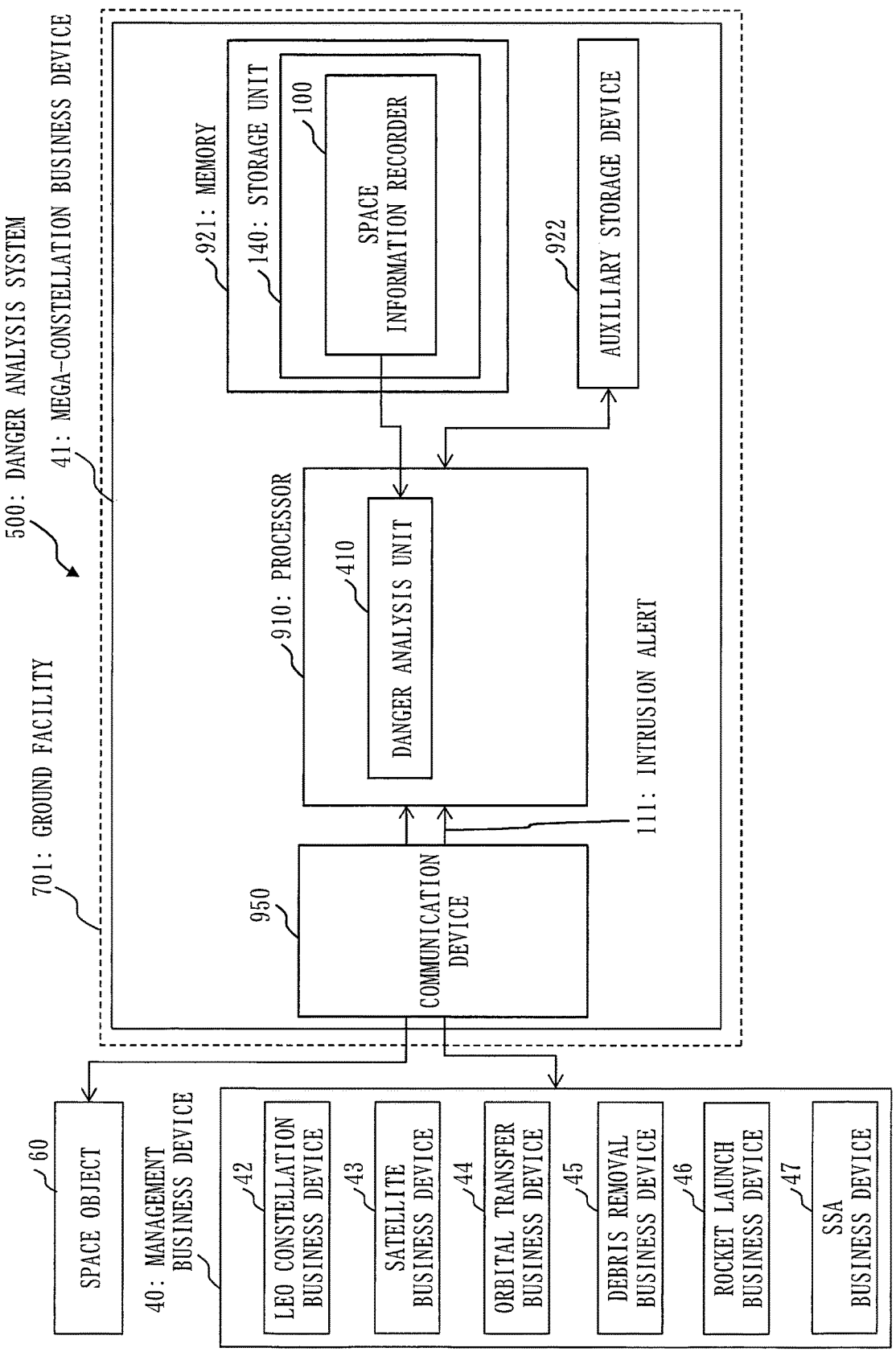
FIG. 10 is an example of a configuration of the mega-constellation business device in the danger analysis system according to Embodiment 1.

FIG. 10 is an example of a configuration of the mega-constellation business device 41 in the danger analysis system 500 according to this embodiment.

The danger analysis system 500 includes a space information recorder 100 and the management business device 40. The danger analysis system 500 is a system that foresees in advance a collision risk between two space objects among a plurality of space objects so as to avoid a collision.

The space information recorder 100 acquires orbit forecast information, which is forecast values of orbits of space objects, from the management business device 40 that is used by a management business operator that manages space objects flying in space, and records the orbit forecast information. The space information recorder 100 may be installed in the management business device 40, or may be installed in another device that communicates with each management business device 40. The space information recorder 100 may be installed in the ground facility 700. Alternatively, the space information recorder 100 may be installed in the satellite constellation forming system 600.

The management business device 40 provides information related to space objects 60 such as artificial satellites or debris. The management business device 40 is a computer of a business operator that collects information related to the space objects 60 such as artificial satellites or debris.

The management business device 40 includes devices such as the mega-constellation business device 41, the LEO constellation business device 42, the satellite business device 43, the orbital transfer business device 44, the debris removal business device 45, the rocket launch business device 46, and an SSA business device 47.

The mega-constellation business device 41 manages a mega-constellation composed of 100 or more satellites. The mega-constellation business device 41 is a computer of a mega-constellation business operator that conducts a large-scale constellation, that is, mega-constellation business.

The LEO constellation business device 42 is a computer of an LEO constellation business operator that conducts a low Earth orbit constellation, that is, LEO constellation business.

The satellite business device 43 is a computer of a satellite business operator that handles one to several satellites.

The orbital transfer business device 44 is a computer of an orbital transfer business operator that performs a space object intrusion alert for a satellite.

The debris removal business device 45 is a computer of a debris removal business operator that conducts a debris retrieval business.

The rocket launch business device 46 is a computer of a rocket launch business operator that conducts a rocket launch business.

The SSA business device 47 is a computer of an SSA business operator that conducts an SSA business, that is, a space situational awareness business.

The management business device 40 may be a device other than the above, provided that it is the device that collects information on space objects such as artificial satellites or debris, and provides the collected information to the space information recorder 100. When the space information recorder 100 is installed on an SSA public server, the space information recorder 100 may be configured to function as the SSA public server.

The information provided from the management business device 40 to the space information recorder 100 will be described in detail later.

The management business device 40 of FIG. 9 includes a processor 910 and also includes other hardware components such as a memory 921, an auxiliary storage device 922, and a communication device 950.

The management business device 40 of FIG. 9 includes, as functional elements, a determination unit 110, an issuance unit 120, and a storage unit 140. In the storage unit 140, the space information recorder 100 is stored.

The functions of the determination unit 110 and the issuance unit 120 are realized by software or hardware. The storage unit 140 is provided in the memory 921. Alternatively, the storage unit 140 may be provided in the auxiliary storage device 922. Alternatively, the storage unit 140 may be divided and provided in the memory 921 and the auxiliary storage device 922.

As illustrated in FIG. 10, the mega-constellation business device 41 includes a processor 910 and also includes other hardware components such as a memory 921, an auxiliary storage device 922, and a communication device 950.

The mega-constellation business device 41 of FIG. 10 includes, as functional elements, a danger analysis unit 410 and a storage unit 140. In the storage unit 140, the space information recorder 100 is recorded.

The functions of the danger analysis unit 410 are realized by software or hardware. The storage unit 140 is provided in the memory 921. Alternatively, the storage unit 140 may be provided in the auxiliary storage device 922. Alternatively, the storage unit 140 may be divided and provided in the memory 921 and the auxiliary storage device 922.

FIG. 11 is a diagram illustrating an example of orbit forecast information 51 included in the space information recorder 100 according to this embodiment.

The space information recorder 100 stores, in the storage unit 140, the orbit forecast information 51 in which forecast values of orbits of space objects 60 are set. For example, the space information recorder 100 may acquire forecast values of the orbit of each of space objects 60 from the management business device 40 used by a management business operator that manages the space objects 60 and store them as the orbit forecast information 51. Alternatively, the space information recorder 100 may acquire the orbit forecast information 51 in which forecast values of the orbit of each of the space objects 60 are set from the management business operator and store it in the storage unit 140.

The management business operator is a business operator that manages space objects 60 that fly in space, such as a satellite constellation, various types of satellites, a rocket, and debris. As described above, the management business device 40 used by each management business operator is a computer such as the mega-constellation business device 41, the LEO constellation business device 42, the satellite business device 43, the orbital transfer business device 44, the debris removal business device 45, the rocket launch business device 46, or the SSA business device 47.

The orbit forecast information 51 includes satellite orbit forecast information 52 and debris orbit forecast information 53. In the satellite orbit forecast information 52, forecast values of the orbits of satellites are set. In the debris orbit forecast information 53, forecast values of the orbits of debris are set. In this embodiment, it is arranged that the satellite orbit forecast information 52 and the debris orbit forecast information 53 are included in the orbit forecast information 51. However, the satellite orbit forecast information 52 and the debris orbit forecast information 53 may be stored in the storage unit 140 as separate pieces of information.

In the orbit forecast information 51, information such as a space object identifier (ID) 511, a forecast epoch 512, forecast orbital elements 513, and a forecast error 514 is set.

The space object ID 511 is an identifier that identifies a space object 60. In FIG. 11, a satellite ID and a debris ID are set as the space object ID 511. Specifically, a space object is an object such as a rocket launched into outer space, an artificial satellite, a space station, a debris removal satellite, a planetary space probe, or a satellite or rocket that has become debris after completing a mission.

The forecast epoch 512 is an epoch that is forecast for the orbit of each of the space objects.

The forecast orbital elements 513 are orbital elements that identify the orbit of each of the space objects. The forecast orbital elements 513 are orbital elements that are forecast for the orbit of each of the space objects. In FIG. 11, the six Keplerian elements are set as the forecast orbital elements 513.

The forecast error 514 is an error that is forecast for the orbit of each of the space objects. In the forecast error 514, a travelling direction error, an orthogonal direction error, and a basis for the error are set. In this way, the forecast error 514 explicitly indicates the amount of error included in a record value together with the basis. The basis for the amount of error includes at least one or all of means for measurement, the content of data processing performed as means for improving the precision of location coordinate information, and a result of statistical evaluation on past data.

In the orbit forecast information 51 according to this embodiment, the forecast epoch 512 and the forecast orbital elements 513 are set for the space object 60. Using the forecast epoch 512 and the forecast orbital elements 513, the time and location coordinates of the space object 60 in the near future can be obtained. The time and location coordinates of the space object 60 in the near future may be set in the orbit forecast information 51.

As described above, the orbit forecast information 51 includes information on the orbit of each space object including the epoch and orbital elements or the time and location coordinates, and explicitly indicates forecast values of the space object 60 in the near future.

With respect to satellite constellations of mega-constellation business operators, factors in variations and fluctuations in orbital altitude are analyzed and classified as described below, focusing on each of a category of an individual satellite, a category of the same orbital plane, a category of multiple orbital planes, a category of constellations with the same nominal altitude, and a category of constellations at nearby orbital altitudes.

FIG. 12 is a diagram illustrating fluctuations in orbital altitude in a category of an individual satellite in a steady operation phase in a satellite constellation.

The factors in fluctuations in orbital altitude in the category of an individual satellite in a steady operation phase in a satellite constellation according to this embodiment include the following factors.

<<Deviations in Shape of One Orbit>>
  Fluctuations due to a flattening effect of Earth
  Fluctuations due to gravity deviations of Earth
  Deviations due to eccentricity
<<Deviations in Altitude of One Orbit>>
  Above the polar region/above the equator
  Perigee/apogee
<<Fluctuations Over time>>
  Daily fluctuations
  Seasonal fluctuations
<<Fluctuations Due to Orbit or Attitude Control>>
  Altitude rise due to acceleration
  Altitude drop due to deceleration
  Fluctuations due to changes in orbital inclination
<<Altitude Drop Due to Deceleration Caused by Atmospheric Drag>>
<<Tolerances and Errors>>
  Difference between a planned orbit by design and an actual orbit
  Difference between analytical prediction and an actual orbit FIG. 13 is a diagram illustrating variations in the shape of the orbital plane in a category of the same orbital plane in a constellation satellite group that realizes a single mission at the same altitude (nominal).

The factors in fluctuations in the category of the same orbital plane in a constellation satellite group that realizes a single mission at the same altitude (nominal) include the following factors.

Figure 14:
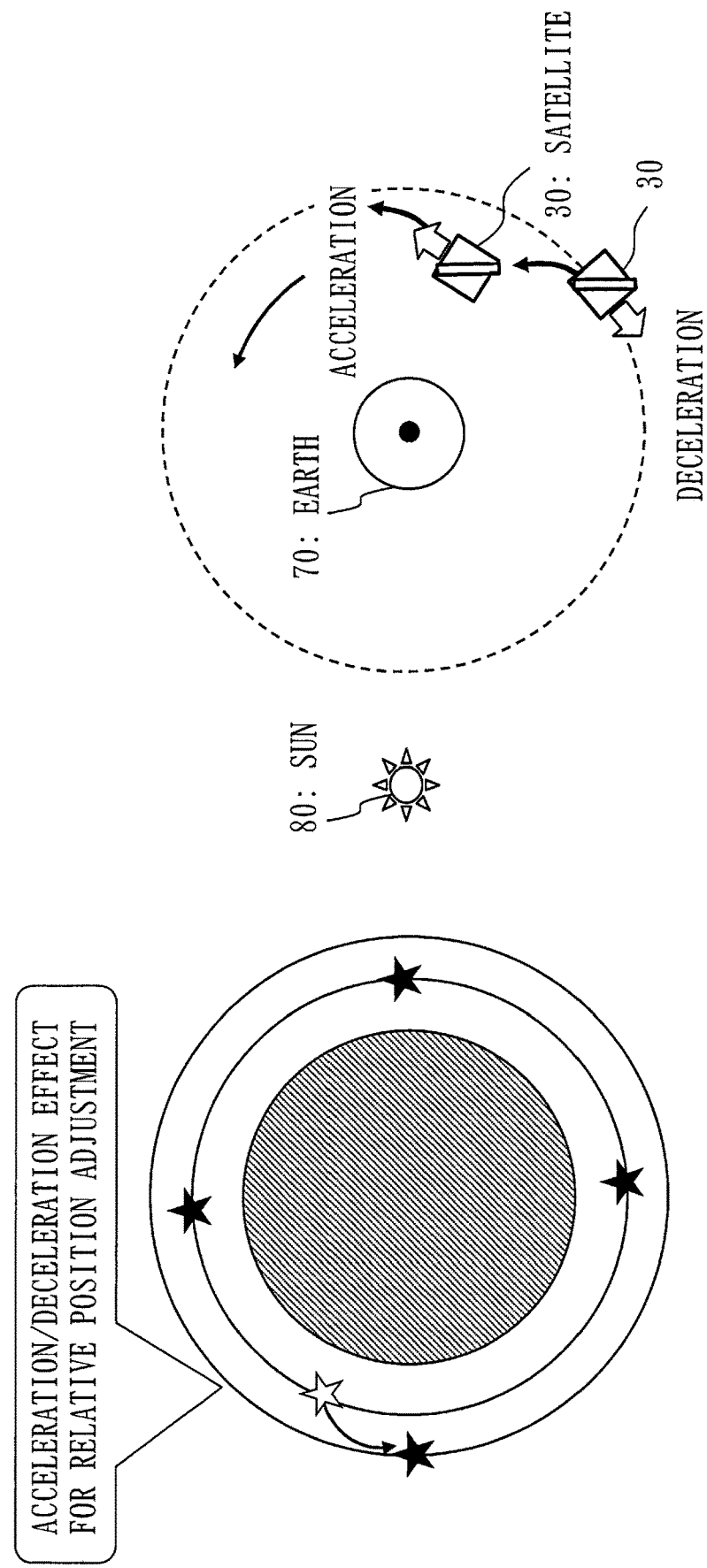
FIG. 14 is a diagram illustrating relative fluctuations between satellites in the same orbital plane (synchronous operation in steady operation)

<<Variations in the Shape of Orbital Plane>>
  Difference in eccentricity between satellites
  Difference in major axis vector between satellites FIG. 14 is a diagram illustrating relative fluctuations between satellites in the same orbital plane (synchronous operation in steady operation).

The relative fluctuations between satellites in the same orbital plane (synchronous operation in steady operation) include the following factors.

Figure 15:
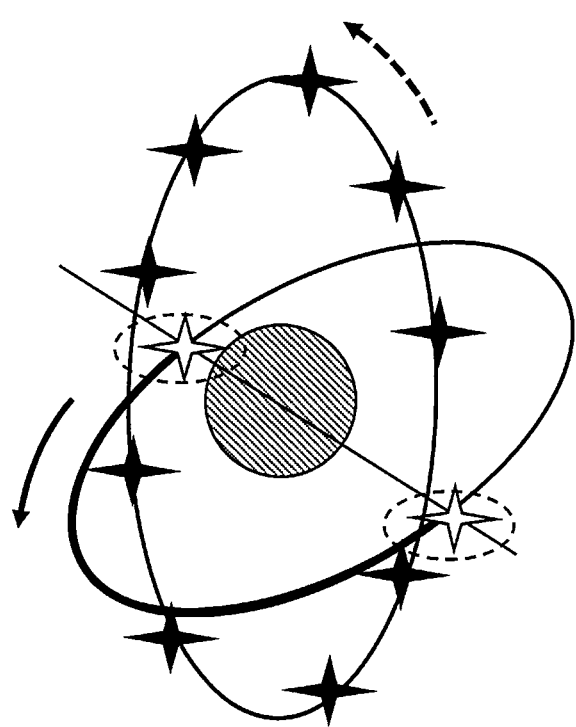
FIG. 15 is a diagram illustrating factors in fluctuations in multiple orbital planes in a constellation satellite group that realizes a single mission at the same altitude (nominal)

<<Relative Fluctuations Between Satellites in the Same Orbital Plane (Synchronous Operation in Steady Operation)>>
  Influence of orbit or attitude control for relative altitude or position adjustment
  Effect of acceleration or deceleration for relative position adjustment FIG. 15 is a diagram illustrating factors in fluctuations in a category of multiple orbital planes in a constellation satellite group that realizes a single mission at the same altitude (nominal).

The factors in fluctuations in the category of multiple orbital planes in a constellation satellite group that realizes a single mission at the same altitude (nominal) include the following factors.

<<Factors in Fluctuations in the Category of Multiple Orbital Planes in a Constellation Satellite Group that Realizes a Single Mission at the Same Altitude (Nominal)>>
  Upper and lower limits when the orbital altitude is changed for each orbital plane for collision avoidance
  Upper and lower limits when the eccentricity is changed for each orbital plane
  Upper and lower limits when the major axis vector is changed for each orbital plane FIG. 16 is a diagram illustrating changes of altitudes in a category of a constellation satellite group.

The category of changes of altitudes of a constellation satellite group include the following factors.

<<Category of Changes of Altitudes of a Constellation Satellite Group>>
  Altitude rise or drop of the entire satellite group for a collision avoidance action
  Altitude rise or drop of part of the satellite group for a collision avoidance action FIG. 17 is a diagram illustrating an example of a category of constellation satellite groups of the same business operator at nearby altitudes.

As a specific example, a mega-constellation business operator in the United States has announced plans to construct three different satellite constellations at orbital altitudes of about 340 km. As a general rule, satellites at different altitudes are not operated in synchronization, and it is assumed that there will be no cooperative operation to realize a communication mission.

In addition to the three constellations at orbital altitudes of about 340 km, the same business operator plans to construct a constellation at an orbital altitude of about 550 km and a constellation at an orbital altitude of about 1150 km.

Furthermore, it needs to be noted that there are factors described below as error factors.

<<Time Errors>>
  Errors in the clock provided in a satellite
  System errors in operation tracked and controlled by a ground system
  Predicted errors and errors in actual orbits
<<Altitude Measurement Errors>>
  Measurement errors of the GPS included in a satellite
  Ranging errors from the ground
  Measurement errors by the SSA business operator from the ground
  Errors in high-precision prediction after a precise orbit is decided by a business operator
<<Location Measurement Errors>>
  Measurement errors of the GPS included in a satellite
  Ranging errors from the ground
  Measurement errors by the SSA business operator from the ground
  Errors in high-precision prediction after a precise orbit is decided by a business operator
<<Ambiguity Caused by Fluctuation Factors>>
  Fluctuations in atmospheric drag
  Fluctuations in the solar wind FIGS. 18 to 21 are an example of configurations and usage patterns of orbital altitude information for each category included in the space information recorder 100 according to this embodiment.

In FIGS. 18 to 21, orbital altitude information is classified according to category, taking into consideration the above factors in altitude fluctuations.

The space information recorder 100 includes two or more categories of the following categories.

The space information recorder 100 includes information on upper and lower limit values of the orbital altitude or on a nominal altitude and an altitude fluctuation width for each category.

- A category, acquired from the mega-constellation business device 41 which is a management business device of a satellite group constituting a mega-constellation, of different constellations formed at nearby altitudes by the same business operator
- A category of a satellite group of each constellation that flies at the same nominal altitude and cooperatively realizes the same mission
- A category of multiple orbital planes
- A category of each orbital plane of the multiple orbital planes
- A category of an individual satellite As illustrated in FIG. 18, a category 601 of constellations of multiple business operators includes information of business operators A, B, and so on.

In a category 602 of constellations of the same business operator, information on constellations managed by the business operator A is set.

For example, information on constellations 340, 550, and 1150 that are managed by the business operator A and respectively have the same altitudes (nominal) is set.

The constellation 340 is each constellation with the same altitude (nominal) of 340 km.

The constellation 550 is each constellation with the same altitude (nominal) of 550 km.

The constellation 1150 is each constellation with the same altitude (nominal) of 1150 km.

In a category 603 of different constellations of the same business operator at nearby altitudes, constellation information of each constellation with the same altitude (nominal) is set.

For example, information on constellations A, B, and C included in the constellation 340 with the same altitude of 340 km is set.

The category 603 of different constellations of the same business operator at nearby altitudes has a category 504 of a constellation group corresponding to the constellation 340. The category 504 of a constellation group includes an ID of the constellation group and information on upper and lower limit values of the orbital altitude or on a nominal altitude and an altitude fluctuation width.

The category 504 of a constellation group corresponding to a same-altitude (nominal) constellation group is used for macro-discussion such as discussion on overall STM, as indicated in FIG. 19.

In each category 604 of same-altitude (nominal) constellations, information on each same-altitude (nominal) constellation is set.

For example, information on each of the constellations A, B, and C included in the constellation 340 with the same altitude (nominal) of 340 km is set.

Referring to FIGS. 18 to 21, the configuration of each category 604 of same-altitude (nominal) constellations will be described.

This will be described using the constellation A as an example.

As illustrated in FIG. 18, the category 604 of same-altitude (nominal) constellations has a category 503 of a satellite group of each same-altitude (nominal) constellation corresponding to each same-altitude (nominal) constellation.

The category 503 of a satellite group includes an ID of the constellation group and information on upper and lower limit values of the orbital altitude or on a nominal altitude and an altitude fluctuation width.

The category 503 of a satellite group corresponding to each same-altitude (nominal) constellation is used when an STM business operator detects an intrusion by a space object into a congested region of a mega-constellation, as indicated in FIG. 19.

In a category 605 of orbital planes included in each same-altitude (nominal) constellation, information on orbital planes included in each same-altitude (nominal) constellation is set.

In FIG. 18, information on orbital planes A, B, C, and so on included in the constellation A, which is a same-altitude (nominal) constellation, is set. It also has a category 502 of variations in a satellite group in a single orbital plane for each orbital plane.

The category 502 of variations in a satellite group in a single orbital plane includes an ID of the orbital plane and information on upper and lower limit values of the orbital altitude or on a nominal altitude and an altitude fluctuation width.

The category 502 of variations in a satellite group in a single orbital plane is used for creating a launch plan by a rocket launch business operator or an orbital transfer satellite business operator, as indicated in FIG. 20. It is also used for creating a deorbit plan by a satellite business operator or a debris removal business operator that performs PMD, which is deorbit after completion of a mission in orbit.

In a category 606 of each orbital plane included in each same-altitude (nominal) constellation, information on individual satellites in each orbital plane included in each same-altitude (nominal) constellation is set.

As illustrated in FIGS. 18 to 21, the category 606 of each orbital plane included in each same-altitude (nominal) constellation has a category 501 of variations in individual satellites.

Figure 21:
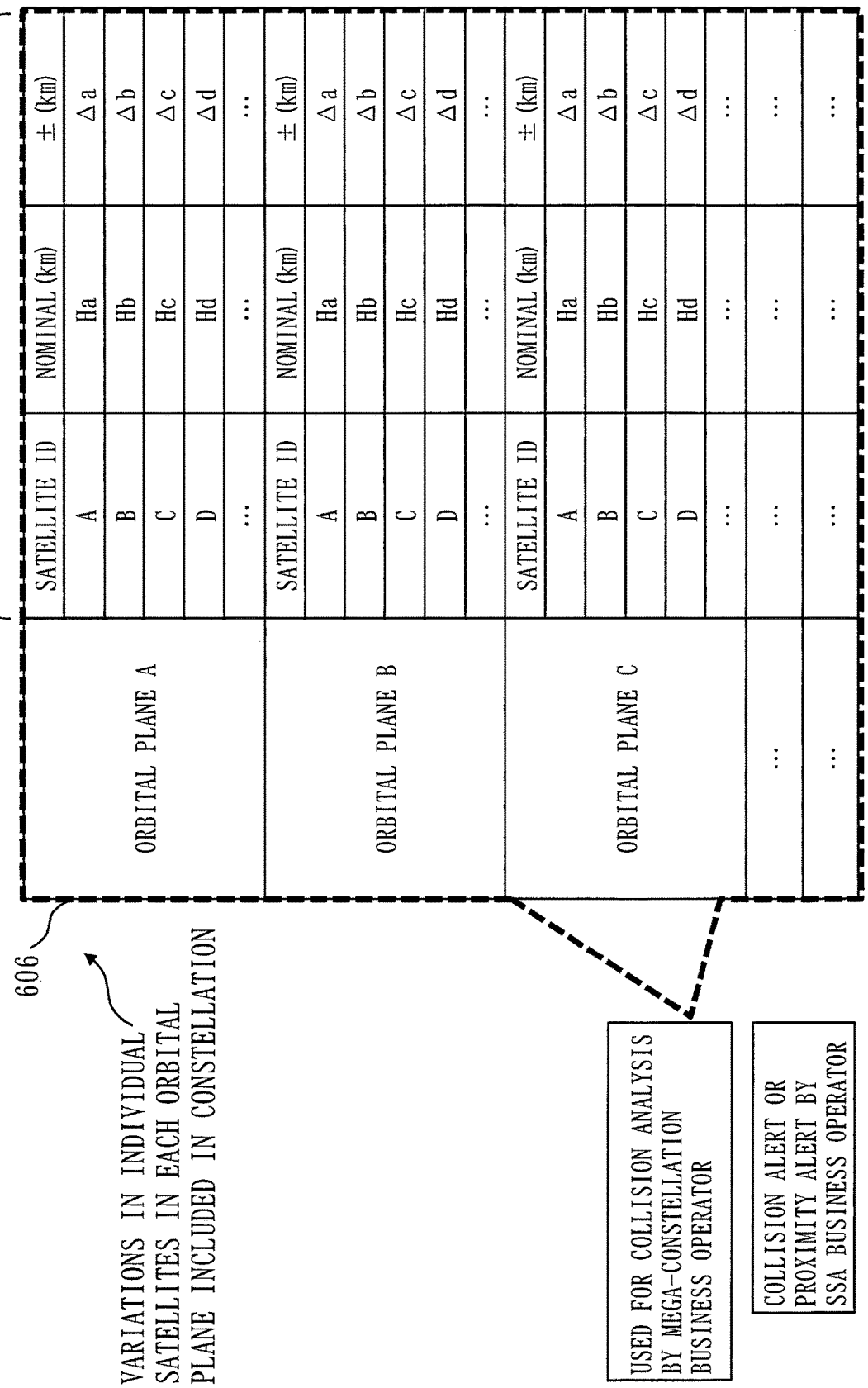
FIG. 21 is an example of a configuration and a usage pattern of orbital altitude information for each category included in the space information recorder according to Embodiment 1.

As illustrated in FIG. 21, for example, the category 501 of variations in individual satellites in the orbital plane A included in the constellation A includes an ID of each satellite included in the orbital plane and information on upper and lower limits values of the orbital plane or on a nominal altitude and an altitude fluctuation width.

The category 501 of variations in individual satellites is used for collision analysis by the mega-constellation business operator, as indicated in FIG. 21. It is also used for determining issuance of a collision alert or a proximity alert by the SSA business operator.

Use patterns of the space information recorder 100 according to this embodiment will now be described.

When the mega-constellation business device 41 uses the space information recorder 100, the mega-constellation business device 41 itself can perform highly precise proximity and collision analysis because it has high-precision orbit information of its own satellite group in advance. However, it is difficult for the mega-constellation business device 41 to comprehensively handle information on space objects owned by other business operators or debris by including it in the space information recorder 100 of the mega-constellation business device 41. Therefore, it is rational to acquire a proximity alert, a collision alert, or an alert for an intrusion into a region congested with mega-constellation satellites, as forecast information, from the SSA business operator.

<Use of the Space Information Recorder 100 by the SSA Business Device 47>

When the SSA business device 47 uses the space information recorder 100, it is difficult to update orbit information of all the satellite groups owned by the mega-constellation business operator in real time. Therefore, it is appropriate that the SSA business device 47 analyze and evaluate whether there is a possibility that a space object owned by another business operator or debris will intrude into an area congested with mega-constellation satellites, using information including variations in orbital altitude as a satellite group.

If an intrusion into a congested region is foreseen, the SSA business device issues an intrusion alert to the mega-constellation business device and the business device of the space object concerned. Then, the SSA business device acquires high-precision information of the individual satellite for which a collision is foreseen and the satellite group of the orbital plane that includes the individual satellite from the mega-constellation business device.

Use of this information allows proximity and collision analysis to be performed for a specific satellite. Thus, if a proximity or collision is foreseen, an intrusion alert is issued to the mega-constellation business operator and the business operator of the space object concerned.

If the SSA business device 47 provides high-precision orbit information of the intruding space object together with an intrusion alert to the mega-constellation business operator, the mega-constellation business device can also perform proximity and collision analysis, as described above.

Figure 22:
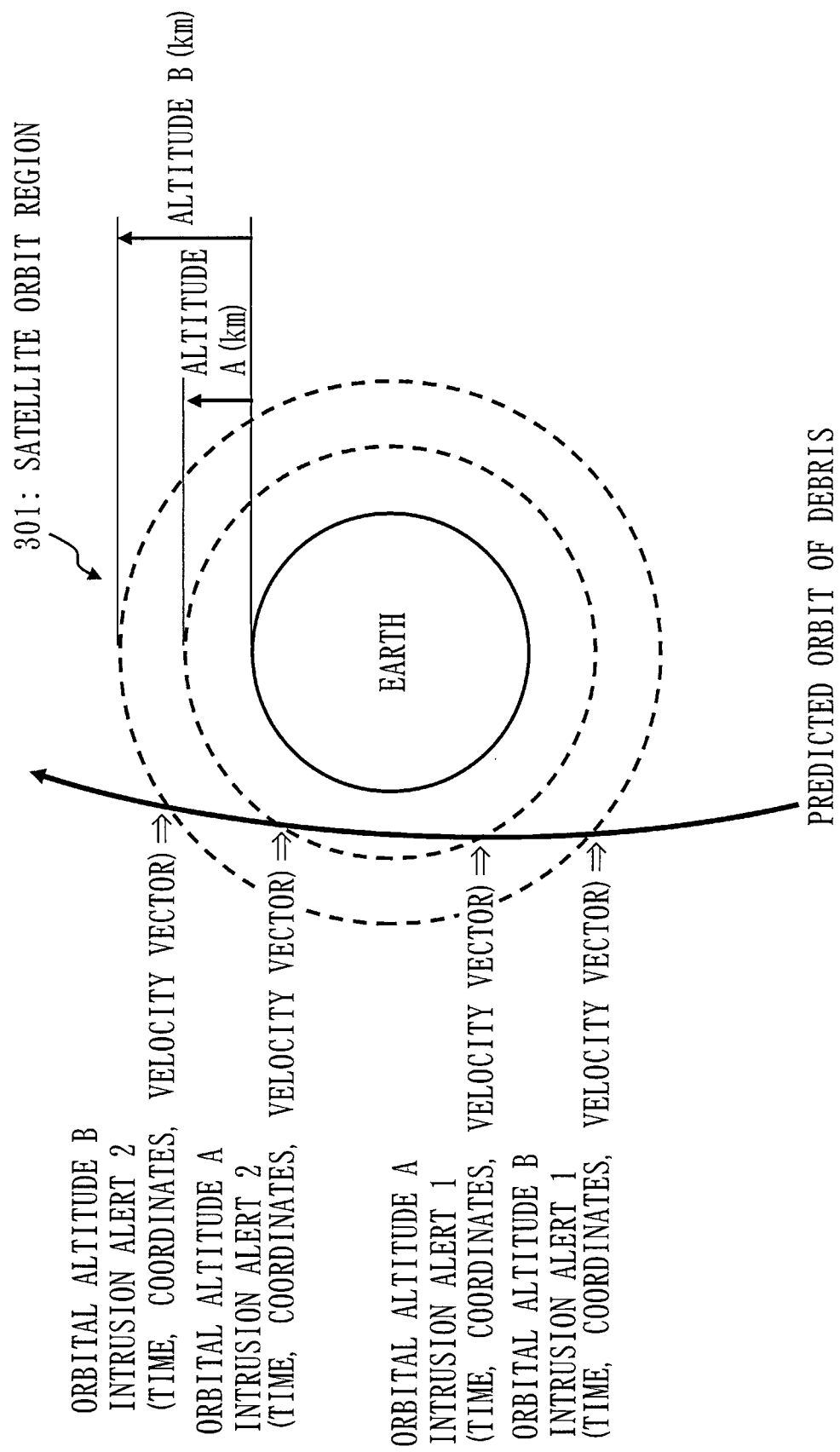
FIG. 22 is a diagram illustrating an example of issuance of alerts when debris passes through orbital altitudes of a satellite constellation according to Embodiment 1.

FIG. 22 is a diagram illustrating an example of issuance of an alert when debris passes through orbital altitudes of a satellite constellation according to this embodiment.

Referring to FIG. 22, a procedure for issuing an intrusion alert for passage of debris through a congested region will be indicated. Using the upper and lower limit values of the orbital altitude of the mega-constellation satellite group included in the space information recorder 100, it is possible to analyze time points and coordinates of an entrance and an exit of an intruding space object in passing through the congested region and a velocity vector. Therefore, the SSA business device 47 notifies this information together with the intrusion alert to the business operators involved.

As described above, the danger analysis system 500 that includes the mega-constellation business device 41 and the SSA business device 47 that is used by an SSA business operator performs a danger analysis method with the following procedures.

The danger analysis system 500 includes the space information recorder 100 and the management business device 40, and foresees a collision risk between two space objects among a plurality of space objects in advance so as to avoid a collision.

A procedure in which the SSA business device 47 issues an intrusion alert for an intrusion by a space object into an orbital altitude region where a mega-constellation is present to the mega-constellation business operator, based on orbital altitude information included in a category of a satellite group. The category of a satellite group refers to a category of a constellation that flies at the same nominal altitude and cooperatively realizes the same mission.

A procedure in which the mega-constellation business device 41 performs danger analysis to analyze danger of a proximity or collision between two space objects for which a collision risk is foreseen, based on the intrusion alert and orbit information of an intruding object that have been acquired from the SSA business device 47.

<Use of the Space Information Recorder 100 by the Rocket Launch Business Device 46>

When the rocket launch business device 46 uses the space information recorder 100, a notification is made to the mega-constellation business operator with a proximity or collision risk, using orbit information of a satellite group that may fly above a launch lift-off point in a time period in which the launch is planned. In this case, if the rocket launch business device 46 provides high-precision orbit information of a planned flight orbit in the launch to the mega-constellation business operator, the mega-constellation business device 41 can perform highly precise proximity and collision analysis. If a proximity or collision is foreseen, collision avoidance is realized by changing the rocket launch time or by performing a collision avoidance operation on the mega-constellation side.

As described above, the danger analysis system 500 that includes the mega-constellation business device 41 and the rocket launch business device 46 that is used by a rocket launch business operator performs the danger analysis method with the following procedures.

A procedure in which the rocket launch business device 46 notifies the mega-constellation business operator of a launch plan according to which a rocket will pass through an orbital altitude region where a mega-constellation is present, based on orbital altitude information included in the category of a satellite group.

A procedure in which the mega-constellation business device 41 performs danger analysis to analyze danger of a proximity or collision between two space objects for which a collision risk is foreseen, based on the launch plan and orbit information of the rocket that have been acquired from the rocket launch business device.

<Use of the Space Information Recorder 100 by the Orbital Transfer Business Device 44>

When a satellite business operator that performs an orbital transfer uses the space information recorder 100, an orbital transfer satellite may pass through a congested altitude of a mega-constellation during an orbital transfer from the perigee to the apogee of a geostationary transfer orbit GTO. Therefore, if high-precision orbit information of a planned flight orbit of the orbital transfer is provided to the mega-constellation business operator in advance, the mega-constellation business operator can perform highly precise proximity and collision analysis. If a proximity or collision is foreseen, collision avoidance is performed by changing the orbital transfer time or performing a collision avoidance operation on the mega-constellation side.

As described above, the danger analysis system 500 that includes the mega-constellation business device 41 and the orbital transfer business device 44 that is used by an orbital transfer business operator that manages a satellite that performs an orbital transfer performs the danger analysis method with the following procedures.

A procedure in which the orbital transfer business device 44 notifies the mega-constellation business operator of an orbital transfer plan according to which an orbital transfer satellite will pass through an orbital altitude region where a mega-constellation is present, based on orbital altitude information included in the category of a satellite group.

A procedure in which the mega-constellation business device 41 performs danger analysis to analyze danger of a proximity or collision between two space objects for which a collision risk is foreseen, based on the orbital transfer plan and orbit information of the orbital transfer satellite that have been acquired from the orbital transfer business device 44.

<Use of the Space Information Recorder 100 by the Satellite Business Device 43>

When a satellite business operator or debris removal business operator during a deorbit operation uses the space information recorder 100, in the process of causing a space object to descent in orbital altitude from a high altitude and enter the atmosphere the space object may pass through a congested altitude of a mega-constellation. Therefore, high-precision orbit information of a planned flight orbit of an orbital transfer is provided to the mega-constellation business operator in advance. This allows the mega-constellation business operator to perform highly precise proximity and collision analysis. If a proximity or collision is foreseen, collision avoidance is performed by changing the timing or speed of the orbital descent or by performing a collision avoidance operation on the mega-constellation side.

As described above, the danger analysis system 500 that includes the mega-constellation business device 41 and the satellite business device 43 that is used by a satellite business operator that performs deorbit performs the danger analysis method with the following procedures.

A procedure in which the satellite business device 43 notifies the mega-constellation business operator of a deorbit plan according to which a deorbiting satellite will pass through an orbital altitude region where a mega-constellation is present, based on orbital altitude information included in the category of a satellite group.

A procedure in which the mega-constellation business device 41 performs danger analysis to analyze danger of a proximity or collision between two space objects, based on the deorbit plan and orbit information of the deorbiting satellite that have been acquired from the satellite business device 43.

<Use of the Space Information Recorder 100 by the Debris Removal Business Device 45>

The danger analysis system 500 that includes the mega-constellation business device 41 and the debris removal business device 45 that is used by a debris removal business operator that manages a debris removal satellite performs the danger analysis method with the following procedures.

A procedure in which the debris removal business device 45 notifies the mega-constellation business operator of a deorbit plan according to which the debris removal satellite will pass through an orbital altitude region where a mega-constellation is present, based on orbital altitude information included in the category of a satellite group.

A procedure in which the mega-constellation business device 41 performs danger analysis to analyze danger of a proximity or collision between two space objects, based on the deorbit plan and orbit information of the debris removal satellite that have been acquired from the debris removal business device 45.

As described above, the mega-constellation business device 41 includes the space information recorder 100 and executes the danger analysis method according to this embodiment.

The SSA business device 47 includes the space information recorder 100 and executes the danger analysis method according to this embodiment.

The rocket launch business device 46 includes the space information recorder 100 and executes the danger analysis method according to this embodiment.

The satellite business device 43 includes the space information recorder 100 and executes the danger analysis method according to this embodiment.

The debris removal business device 45 includes the space information recorder 100 and executes the danger analysis method according to this embodiment.

The orbital transfer business device 44 includes the space information recorder 100 and executes the danger analysis method according to this embodiment.

* Description of Operation *

Figure 23:
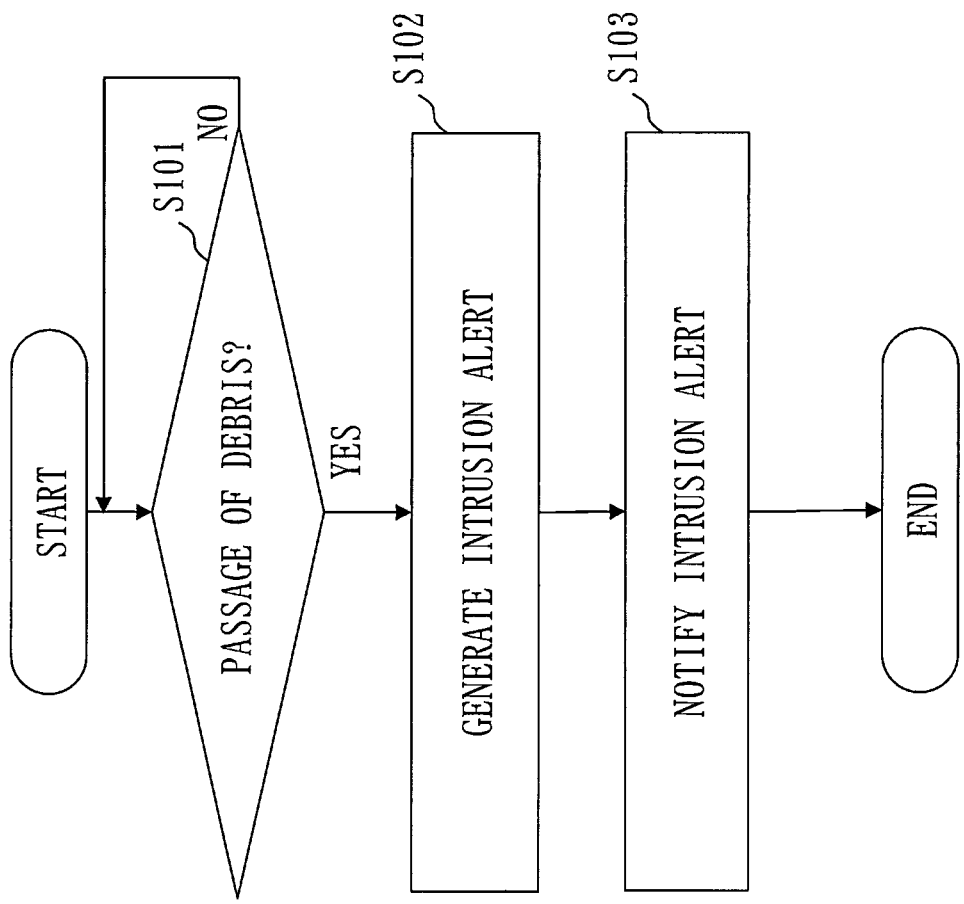
FIG. 23 is a flowchart of an intrusion alert process according to Embodiment 1.

FIG. 23 is a flowchart illustrating an example of an intrusion alert process according to this embodiment. FIG. 22 is a diagram illustrating an example of a predicted orbit of debris that passes through the satellite constellation 20 and an intrusion alert 111 according to this embodiment.

Operation of Space Object Intrusion Alert Process
S100

In step S101, the determination unit 110 determines whether debris will pass through a satellite orbit region 301, which is an orbit or a region where a plurality of satellites constituting the satellite constellation 20 fly, based on the satellite orbit forecast information 52 and the debris orbit forecast information 53. Specifically, the satellite orbit region 301 is an orbit where the satellite constellation 20 is formed. If it is determined that debris will pass through the satellite orbit region 301, the process proceeds to step S102. If it is not determined that debris will pass through the satellite orbit region, the process of step S101 is repeated.

In step S102, the determination unit 110 generates an intrusion alert 111 including a predicted time, predicted location coordinates, and predicted velocity vector information that relate to passage of the debris.

FIG. 22 illustrates a situation in which debris passes through the satellite orbit region 301 where a satellite constellation A at an orbital altitude of A km and a satellite constellation B at an orbital altitude of B km are formed. The determination unit 110 determines whether a predicted orbit of debris passes through a satellite constellation, based on the satellite orbit forecast information 52 and the debris orbit forecast information 53. In FIG. 22, an entrance to and an exit from the satellite constellation A and an entrance to and an exit from the satellite constellation B are passage points of the satellite constellation 20.

The determination unit 110 generates the intrusion alert 111 including a time, coordinates, and a velocity vector that are predicted for passage at each of these four passage points.

In step S103, the issuance unit 120 notifies the intrusion alert 111 to the management business device 40 used by the management business operator that manages the satellites that fly in the satellite orbit region 301. Specifically, the issuance unit 120 notifies the intrusion alert to the satellite constellation business device used by the satellite constellation business operator that operates the satellite constellation. The satellite constellation business device is a business operator that conducts a satellite constellation business such as the mega-constellation business device 41, the LEO constellation business device 42, or the satellite business device 43.

<Collision Avoidance by the Satellite Constellation Forming System>

The satellite constellation forming system 600 described with reference to FIGS. 5 to 8 controls the satellite constellation 20 so as to avoid debris that intrudes into the satellite constellation 20, based on the intrusion alert 111 by the space information recorder 100.

As illustrated in FIGS. 5 to 8, the satellite constellation forming system 600 may be installed in the ground facility 700. In this case, the ground facility 700 controls an avoidance action for avoiding collisions between debris that intrudes into the satellite orbit region 301 and satellites in the satellite constellation 20, based on the intrusion alert 111 by the space information recorder 100.

With the satellite constellation forming system 600, the satellite constellation business operator can operate to avoid collisions without significantly disturbing the relative positional relationship among all satellites at least by a method such as accelerating or decelerating all the satellites at the same time. Therefore, the satellite constellation forming system 600 can avoid collisions with debris by the intrusion alert 111 according to this embodiment.

Description of Effects of this Embodiment

The danger analysis system according to this embodiment can optimize the amount of information and precision for each purpose of use by displaying orbit information of mega-constellation satellite groups by category. Therefore, the danger analysis system according to this embodiment can shorten the information processing time, reduce human resources, and provide a rational method for realizing collision avoidance for space objects.

In the space information recorder according to this embodiment, high-precision orbit information of individual satellites that is used for collision analysis and orbit information that is used by other business operators are classified by category, and the upper and lower limit values are listed for each category by focusing on orbital altitudes.

By selecting a category with an amount of information and precision that are appropriate for each purpose of a business operator, it is possible to rationally perform both proximity and collision analysis with coarse precision on a macro level and collision analysis with high precision when a collision is foreseen demonstrably. Therefore, by using the space information recorder according to this embodiment, there is an effect that time is reduced and human resources are reduced due to reduction in labor.

* Other Configurations *

In this embodiment, the functions of the space information recorder 100 are realized by software. As a modification example, the functions of the space information recorder 100 may be realized by hardware.

Figure 24:
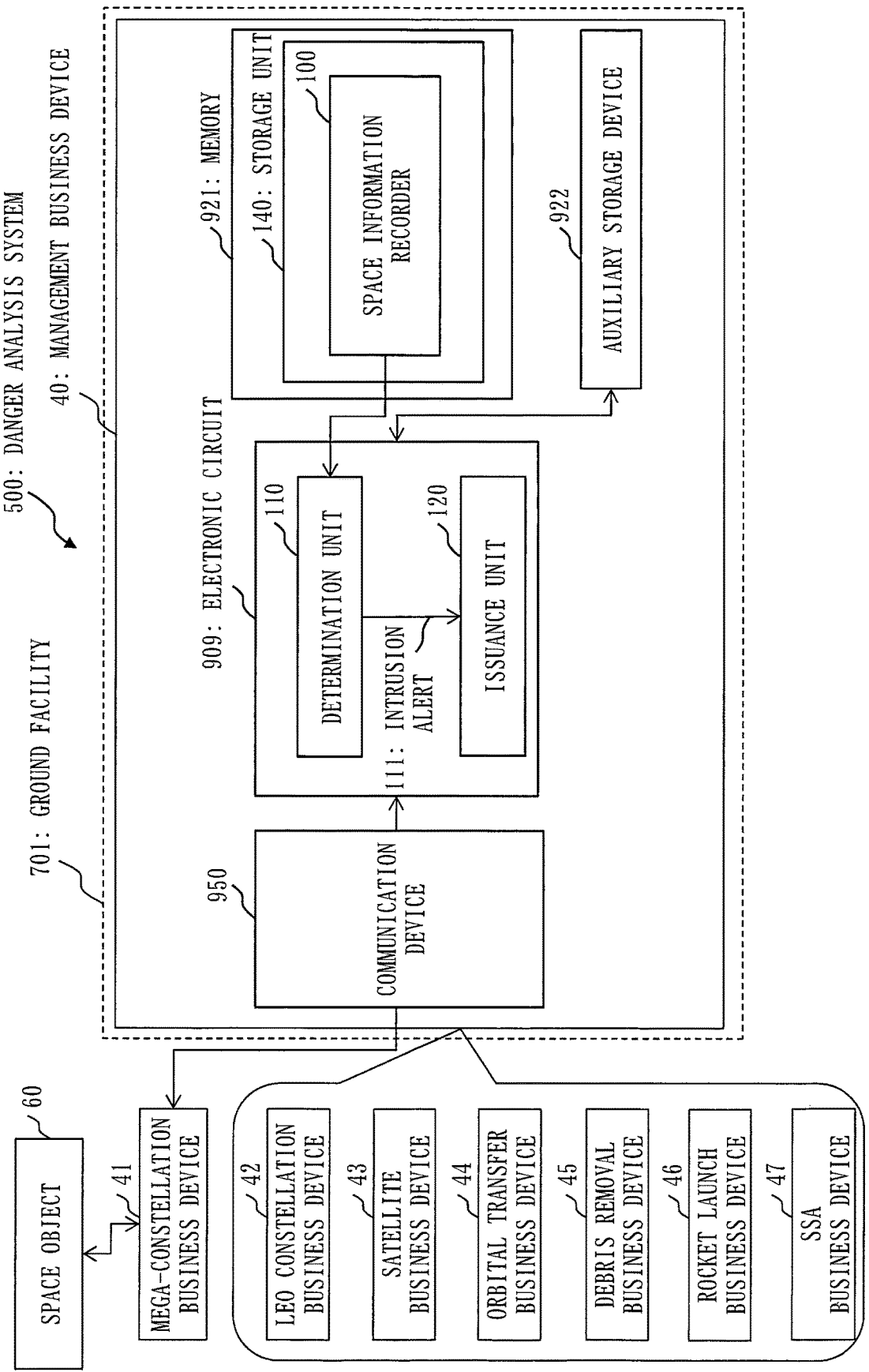
FIG. 24 is an example of a configuration of the management business device other than the mega-constellation business device in the danger analysis system according to a modification example of Embodiment 1.

FIG. 24 is an example of the configuration of the management business device 40 in the danger analysis system 500 according to this embodiment. FIG. 24 illustrates an example of the configuration of the management business device 40 other than the mega-constellation business device 41.

Figure 25:
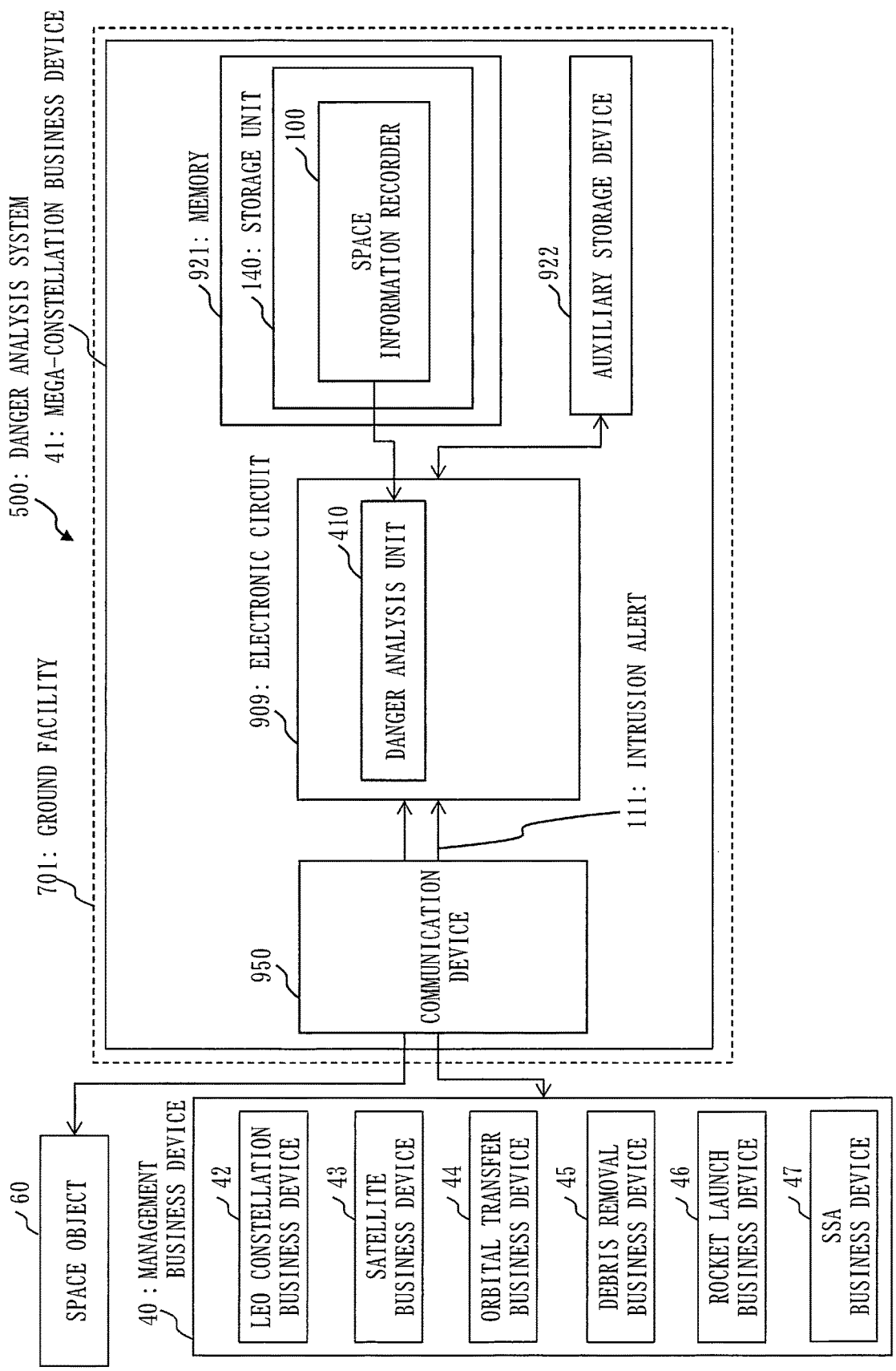
FIG. 25 is an example of a configuration of the mega-constellation business device in the danger analysis system according to a modification example of Embodiment 1.

FIG. 25 is an example of the configuration of the mega-constellation business device 41 in the danger analysis system 500 according to this embodiment.

The management business device 40 includes an electronic circuit 909 in place of the processor 910.

The electronic circuit 909 is a dedicated electronic circuit that realizes the functions of the management business device 40.

Specifically, the electronic circuit 909 is a single circuit, a composite circuit, a programmed processor, a parallel-programmed processor, a logic IC, a GA, an ASIC, or an FPGA. GA is an abbreviation for Gate Array.

The functions of the management business device 40 may be realized by one electronic circuit, or may be distributed among and realized by a plurality of electronic circuits.

As another modification example, some of the functions of the management business device 40 may be realized by the electronic circuit, and the rest of the functions may be realized by software.

Each of the processor and the electronic circuit is also called processing circuitry. That is, the functions of the management business device 40 are realized by the processing circuitry.

Embodiment 2

In this embodiment, differences from Embodiment 1 or additions to Embodiment 1 will be mainly described.

In this embodiment, components that have substantially the same functions as those in Embodiment 1 will be denoted by the same reference signs and description thereof will be omitted.

When the SSA business operator performs debris collision prediction analysis and finds a risk of proximity or collision with satellites in a mega-constellation, it is rational that the mega-constellation business operator makes a judgment on an avoidance action. Unlike a proximity or collision alert for an individual satellite, an intrusion alert is issued to the mega-constellation business operator as a forecast for passage through orbital altitudes of the mega-constellation. Then, the mega-constellation business operator identifies the satellites concerned and makes a judgment on an avoidance action. Similarly, with respect to an alert for a congested region such as a congested orbital plane or the polar region, it is rational to create a system that issues an intrusion alert for a congested region and also includes outsourcing to a debris removal business operator for a countermeasure action.

An arrangement for providing a space object recorder that displays orbit information of satellite groups of mega-constellation business operators by category is required. In addition, a proximity and collision analysis method is required in which the mega-constellation business operator performs proximity and collision analysis with high precision for a space object whose intrusion into a congested region of a mega-constellation satellite group is foreseen based on information in the category of a satellite group.

Consideration is being given to securing flight safety for space objects by constructing a public information system called an open architecture data repository (OADR) so as to share information among business operators.

In this embodiment, an arrangement in which flight safety of space objects is secured by a public information system called an OADR will be described.

When the OADR is constructed as a public institution for international cooperation, an authority for issuing an instruction or a request across a national border may be given to a business operator.

For example, to centrally manage orbit information of space objects held by business operators around the world, it is rational if an instruction or request to provide orbit information to the OADR can be made under rules based on an international consensus.

When a particular country constructs the OADR as a public institution, an authority to issue an instruction or request may be given to a business operator in the country concerned.

It may be arranged such that information is disclosed unconditionally to business operators of the country concerned and information is disclosed conditionally to other business operators.

As disclosure conditions, a payment requirement, a fee setting, a restriction of disclosed items, a restriction of precision of disclosed information, a restriction of disclosure frequency, non-disclosure to a specific business operator, and so on may be set.

For example, a difference between free and chargeable or a difference in fee for acquiring information may arise between the country concerned and other countries, and the setting of disclosure conditions by the OADR will have influence in creating a system of space traffic management or in terms of industrial competitiveness.

It is rational that confidential information on space objects that contributes to security is held by the OADR constructed as a public institution by a nation and is not disclosed to third parties. For this reason, the OADR may include a database to store non-public information in addition to a database for the purpose of information disclosure.

Space object information held by a private business operator includes information that cannot be disclosed generally due to corporate secrets or the like. There is also information that is not appropriate to be disclosed generally because of a huge amount of information or a high update frequency due to constant maneuver control.

When danger analysis and analytical evaluation related to proximities or collisions between space objects are to be performed, it is necessary to take into account orbit information of all space objects regardless of whether or not space objects require confidentiality. For this reason, it is rational that the OADR as a public institution carries out danger analysis taking confidential information into account, and discloses information conditionally by restricting a disclosure recipient or disclosure content if danger is foreseen as a result of analytical evaluation. For example, it is rational to process information to allow disclosure and then disclose the information by restricting a disclosure recipient or disclosure content, such as disclosing only orbit information of a time period with danger to a disclosure recipient that will contribute to avoiding the danger.

If the number of objects in orbit increases and the risk of proximity or collision increases in the future, various danger avoidance measures will be necessary, such as means by which a debris removal business operator removes dangerous debris or means by which a mega-constellation business operator changes an orbital location or passage timing to avoid a collision. If the OADR that is a public institution can instruct or request a business operator to execute a danger avoidance action, a significant effect can be expected in securing flight safety in space.

There are space objects that are managed by an institution such as a venture business operator in an emerging country or a university that has little experience in space business and lacks information that contributes to danger avoidance. If it is foreseen that a space object managed by such an institution that has little experience in space business and lacks information that contributes to danger avoidance will intrude into an orbital altitude zone in which a mega-constellation flies, danger avoidance can be effected promptly and effectively by the OADR acting as an intermediary to transmit information to business operators as required.

In addition, by executing a danger avoidance measure or by interceding for or introducing space insurance for private business operators, contribution can be made to the promotion and industrialization of space traffic management.

Arrangements for realizing the OADR include the following arrangements.

An arrangement that includes only a public database.

An arrangement that has danger analysis means, collision avoidance assistance means, or space situational awareness (SSA) means, and independently contributes to danger avoidance.

An arrangement that makes an instruction or request to a business operator or performs intercession or introduction for a business operator, and contributes to danger avoidance by information management.

As arrangements for realizing the OADR, there are also various possibilities other than the above arrangements.

Note that "the OADR intercedes for implementation of a method" means, for example, a case in which the entities that implement a method, such as the danger analysis method or a space traffic management method, are external business devices other than the OADR, and the OADR mediates between the business devices to prompt the implementation instead of forcibly ordering it. That "the OADR intercedes for implementation of the danger analysis method" is rephrased, for example, as "the OADR mediates so that the external business devices other than the OADR cooperatively implement the danger analysis method". Alternatively, "mediates" may be replaced with "provides direction".

Configuration examples of the OADR according to this embodiment will be described below.

Figure 26:
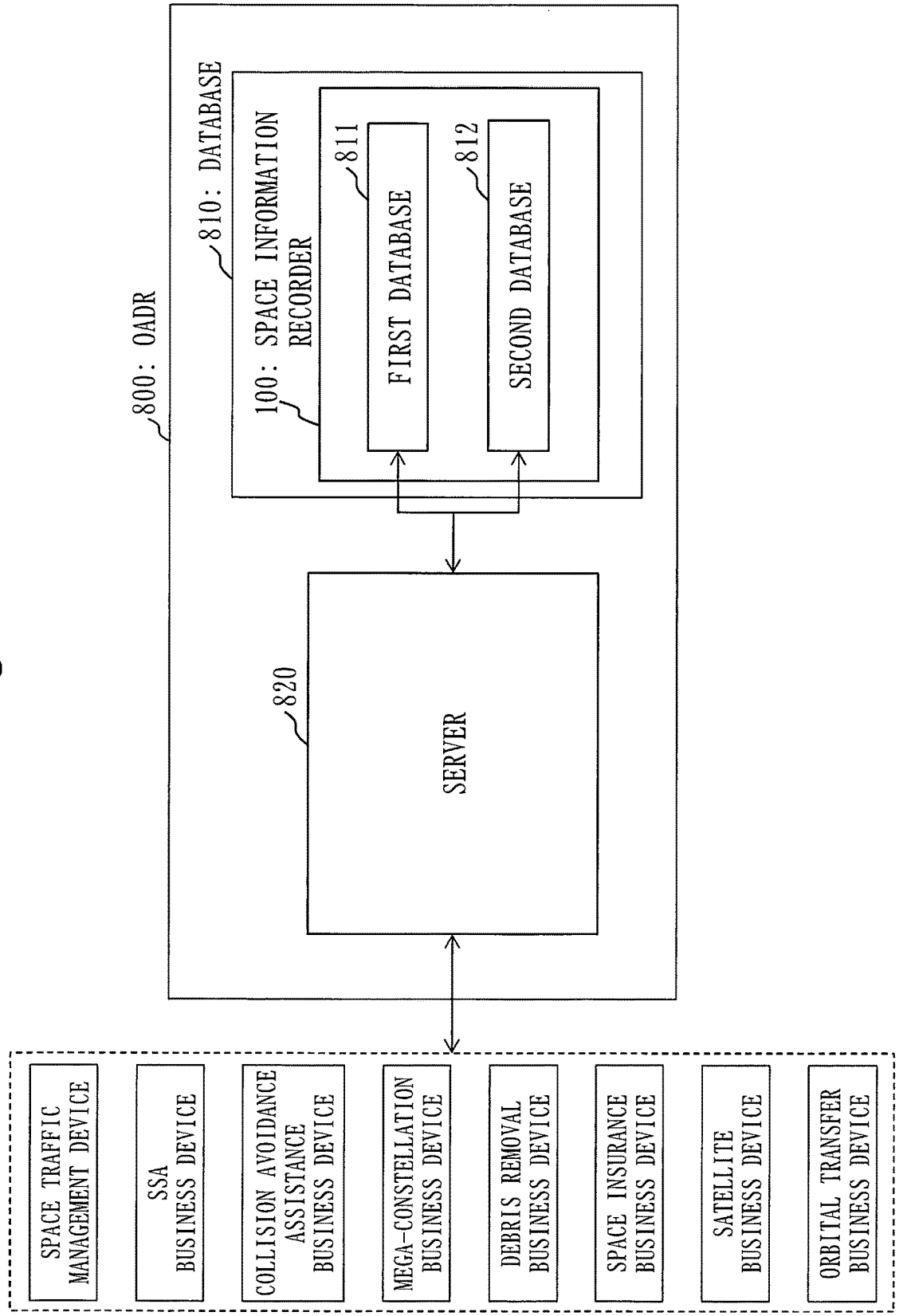
FIG. 26 is a diagram illustrating an example of a functional configuration of an OADR according to Embodiment 2.

FIG. 26 is a diagram illustrating an example of a functional configuration of an OADR 800 according to this embodiment.

Configuration Example 1 of the OADR

The OADR 800 includes the space information recorder 100.

The OADR 800 includes the space information recorder 100 configured as described in Embodiment 1 as a database 810, which is a public database.

The OADR 800 includes the space information recorder 100, so that there is an effect that danger avoidance can be implemented promptly and rationally by categorizing orbit information on a huge number of satellites of mega-constellation business operators and sharing information among business operators.

Configuration Example 2 of the OADR

The OADR 800 provides information to and receives information from all or at least one of a mega-constellation business device, an SSA business device, a satellite business device, a debris removal business device, and an orbital transfer business device, and instructs or requests the mega-constellation business device to execute the danger analysis method described in Embodiment 1.

When the OADR is constructed as a public institution for international cooperation, an authority for issuing an instruction or a request across a national border may be given to a business operator. When a particular country constructs the OADR as a public institution, an authority to issue an instruction or request may be given to a business operator in the country concerned. Therefore, there is an effect that an instruction or request for danger analysis can be made promptly and rationally to the mega-constellation business operator.

Configuration Example 3 of the OADR

As illustrated in FIG. 26, the OADR 800 is a public information system that discloses orbit information of space objects. The OADR 800 includes the database 810 to store orbit information of space objects and a server 820. The server 820 is referred to also as a space information management server that manages space information.

The database 810 includes a first database 811 to store non-public information and a second database 812 to store public information.

The server 820, which is the space information management server, performs danger analysis by referring to the first database 811 and the second database 812. The server 820 identifies and manages free public information and chargeable public information in the second database 812.

In FIG. 26, the database 810 has the configuration of the space information recorder 100, but it may be a database with a different configuration.

Space objects include those whose orbit information is kept non-public due to security needs. When analyzing danger such as a proximity or collision, danger analysis needs to be carried out taking into account non-public information. Therefore, to avoid a risk of information leakage, it is rational to separate databases.

In addition, public information may include free public information and chargeable public information, so that it is necessary to identify and manage these types of information when information is disclosed by the OADR.

Appropriate information management on a need-to-know basis is possible with the OADR by centrally separating non-public data from public data and then identifying and managing chargeable and free public information.

Configuration Example 4 of the OADR

The server 820, which is the space information management server, may perform danger analysis by referring to the first database 811 and the second database 812, and the server 820 may identify and manage unconditional public information and conditional public information in the second database 812.

When a particular country constructs the OADR as a public institution, it is rational to disclose information unconditionally to business operators of the country concerned and disclose information conditionally to other business operators. As conditions, a payment requirement, a fee setting, a restriction of disclosed items, a restriction of precision of disclosed information, a restriction of disclosure frequency, non-disclosure to a specific business operator, and so on can be set.

Configuration Example 5 of the OADR

As illustrated in FIG. 26, the OADR 800 includes the space information recorder 100 as the database 810.

The space information recorder 100 includes the first database 811 to store public information and the second database 812 to store non-public information.

The server 820 acquires space object information including non-public information from all or at least one of a space traffic management device, an SSA business device (space situational awareness business device), a collision avoidance assistance business device, a mega-constellation business device, and a debris removal business device, and stores it in the second database 812. The space traffic management device is provided in the CSpOC, for example.

The CSpOC of the United States has not so far been equipped with a bidirectional line and has unidirectionally notified danger alerts. If the CSpOC is equipped with a space traffic management device, the space traffic management device allows contribution to be made to space traffic management through a bidirectional communication line with other business devices.

The server 820 generates conditional public information for which a disclosure recipient and disclosure content are restricted and stores the conditional public information in the first database 811.

The server 820 transmits the conditional public information to only a specific business device among the SSA business device, the collision avoidance assistance business device, the mega-constellation business device, the debris removal business device, and a space insurance business device that handles space insurance.

Confidential information on space objects that is held by the CSpOC and contributes to security may be disclosed only to the OADR. A proximity or collision risk needs to be analyzed and foreseen by taking confidential information into account.

Confidential information is processed into information that can be disclosed conditionally and then conditional public information that contributes to collision avoidance assistance is shared with only a business device involved in a collision risk. This allows even a private business operator to carry out a collision avoidance action.

In addition, with regard to space object information held by private business operators, if the OADR similarly processes space object information that cannot be generally disclosed into information that can be disclosed conditionally, collision avoidance becomes possible.

In Embodiments 1 and 2 above, each unit that is a functional element of each device and each system has been described as an independent functional block. However, the configurations of each device and each system may be different from the configurations described in the above embodiments. The functional blocks of each device and each system may be arranged in any configuration, provided that the functions described in the above embodiments can be realized. Each device and each system may be one device or a system composed of a plurality of devices.

Portions of Embodiments 1 and 2 may be implemented in combination. Alternatively, one portion of these embodiments may be implemented. These embodiments may be implemented as a whole or partially in any combination.

That is, in Embodiments 1 and 2, portions of Embodiments 1 and 2 may be freely combined, any of the constituent elements may be modified, or any of the constituent elements may be omitted in Embodiments 1 and 2.

The embodiments described above are essentially preferable examples and are not intended to limit the scope of the present disclosure, the scope of applications of the present disclosure, and the scope of uses of the present disclosure. The embodiments described above can be modified in various ways as necessary.

REFERENCE SIGNS LIST

20: satellite constellation; 21: orbital plane; 30: satellite; 31: satellite control device; 32: satellite communication device; 33: propulsion device; 34: attitude control device; 35: power supply device; 40: management business device; 41: mega-constellation business device; 42: LEO constellation business device; 43: satellite business device; 44: orbital transfer business device; 45: debris removal business device; 46: rocket launch business device; 47: SSA business device; 51: orbit forecast information; 52: satellite orbit forecast information; 53: debris orbit forecast information; 511: space object ID; 512: forecast epoch; 513: forecast orbital elements; 514: forecast error; 60: space object; 70: Earth; 100: space information recorder; 110: determination unit; 111: intrusion alert; 120: issuance unit; 140: storage unit; 55: orbit control command; 301: satellite orbit region; 500: danger analysis system; 600: satellite constellation forming system; 11, 11b: satellite constellation forming unit; 300: satellite group; 501, 502, 503, 504, 601, 602, 603, 604, 605, 606: category; 700: ground facility; 510: orbit control command generation unit; 520: analytical prediction unit; 909: electronic circuit; 910: processor; 921: memory; 922: auxiliary storage device; 930: input interface; 940: output interface; 941: display device; 950: communication device; 800: OADR; 810: database; 811: first database; 812: second database; 820: server.

The invention claimed is:
1. A space information recorder, comprising:
circuitry configured to:
acquire orbit forecast information from a management business device that is used by a management business operator that manages a plurality of space objects flying in space,
record the orbit forecast information, the orbit forecast information being forecast values of orbits of the plurality of space objects, and
record information on upper and lower limit values of an orbital altitude or on a nominal altitude and an altitude fluctuation width for each of two or more categories of:
a category, acquired from a mega-constellation business device, of different constellations formed at nearby altitudes by a same business operator, the mega-constellation business device being a management business device of a satellite group constituting a mega-constellation composed of 100 or more satellites;
a category of a satellite group of each constellation that flies at a same nominal altitude and cooperatively realizes a same mission;
a category of orbital planes;
a category of each orbital plane of the orbital planes; and
a category of an individual satellite, wherein at least one of the plurality of space objects or one of the satellites in the satellite group constituting the mega-constellation is controlled to avoid danger analyzed by danger analysis based upon the orbit forecast information and the information on the upper and lower limit values of the orbital altitude or on the nominal altitude and the altitude fluctuation width of each of the categories.
2. A danger analysis system, comprising:
a space information recorder; and
a management business device,
wherein the space information recorder:
acquires orbit forecast information from the management business device that is used by a management business operator that manages a plurality of space objects flying in space,
records the orbit forecast information, and
records information on upper and lower limit values of an orbital altitude or on a nominal altitude and an altitude fluctuation width for each of two or more categories of:
a category, acquired from a mega-constellation business device, of different constellations formed at nearby altitudes by a same business operator, the mega-constellation business device being a management business device of a satellite group constituting a mega-constellation composed of 100 or more satellites;
a category of a satellite group of each constellation that flies at a same nominal altitude and cooperatively realizes a same mission;
a category of orbital planes;
a category of each orbital plane of the orbital planes; and
a category of an individual satellite, and
wherein the management business device foresees a collision risk between two space objects of the plurality of space objects in advance so as to avoid a collision, and
wherein the at least one of the two space objects is controlled based upon the collision risk.
3. A danger analysis method of a danger analysis system that includes a space information recorder and a management business device, the management business device including a mega-constellation business device and an SSA business device that is used by a space situation awareness (SSA) business operator, and the space information recorder acquiring orbit forecast information from the management business device that is used by a management business operator that manages a plurality of space objects flying in space, recording the orbit forecast information, and recording orbital altitude information that includes information on upper and lower limit values of an orbital altitude or on a nominal altitude and an altitude fluctuation width for each of two or more categories of:
a category, acquired from the mega-constellation business device, of different constellations formed at nearby altitudes by a same business operator, the mega-constellation business device being a management business device of a satellite group constituting a mega-constellation composed of 100 or more satellites,
a category of a satellite group of each constellation that flies at a same nominal altitude and cooperatively realizes a same mission,
a category of orbital planes,
a category of each orbital plane of the orbital planes, and
a category of an individual satellite,
the danger analysis method comprising:
issuing, by the SSA business device to the mega-constellation business operator, an intrusion alert for an intrusion by a space object into an orbital altitude region where a mega-constellation is present based on the orbital altitude information included in the category of the satellite group;
performing, by the mega-constellation business device, danger analysis to analyze danger of a proximity or collision between two space objects based on the intrusion alert and orbit information of an intruding object that have been acquired from the SSA business device; and
controlling, by the mega-constellation business device, at least one of the two space objects based upon the danger analysis.

4. The danger analysis method according to claim 3,
wherein the management business device includes the mega-constellation business device and a rocket launch business device that is used by a rocket launch business operator, and
wherein the danger analysis method comprises:
   notifying, by the rocket launch business device, the mega-constellation business operator of a launch plan according to which a rocket will pass through an orbital altitude region where a mega-constellation is present based on the orbital altitude information included in the category of the satellite group; and
   performing, by the mega-constellation business device, the danger analysis to analyze the danger of the proximity or collision between the two space objects based on the launch plan and orbit information of the rocket that have been acquired from the rocket launch business device.

5. The danger analysis method according to claim 3,
wherein the management business device includes the mega-constellation business device and a satellite business device that is used by a satellite business operator that performs deorbit, and
wherein the danger analysis method comprises:
   notifying, by the satellite business device, the mega-constellation business operator of a deorbit plan according to which a deorbiting satellite will pass through an orbital altitude region where a mega-constellation is present based on the orbital altitude information included in the category of the satellite group; and
   performing, by the mega-constellation business device, the danger analysis to analyze the danger of the proximity or collision between the two space objects based on the deorbit plan and orbit information of the deorbiting satellite that have been acquired from the satellite business device.

6. The danger analysis method according to claim 3,
wherein the management business device includes the mega-constellation business device and a debris removal business device that is used by a debris removal business operator, and
wherein the danger analysis method comprises:
   notifying, by the debris removal business device, the mega-constellation business operator of a deorbit plan according to which the debris removal satellite will pass through an orbital altitude region where a mega-constellation is present based on the orbital altitude information included in the category of the satellite group; and
   performing, by the mega-constellation business device, the danger analysis to analyze the danger of the proximity or collision between the two space objects based on the deorbit plan and orbit information of the debris removal satellite that have been acquired from the debris removal business device.

7. The danger analysis method according to claim 3,
wherein the management business device includes the mega-constellation business device and an orbital transfer business device that is used by an orbital transfer business operator that manages a satellite that performs an orbital transfer, and
wherein the danger analysis method comprises:
   notifying, by the orbital transfer business device, the mega-constellation business operator of an orbital transfer plan according to which an orbital transfer satellite will pass through an orbital altitude region where a mega-constellation is present based on orbital altitude information included in the category of the satellite group; and
   performing, by the mega-constellation business device, the danger analysis to analyze the danger of the proximity or collision between the two space objects based on the orbital transfer plan and orbit information of the orbital transfer satellite that have been acquired from the orbital transfer business device.

8. A mega-constellation business device that is a management business device of a satellite group constituting a mega-constellation composed of 100 or more satellites, the mega-constellation business device comprising:
   a space information recorder that records information on upper and lower limit values of an orbital altitude or on a nominal altitude and an altitude fluctuation width for each of two or more categories of:
      a category, acquired from the mega-constellation business device, of different constellations formed at nearby altitudes by a same business operator,
      a category of a satellite group of each constellation that flies at a same nominal altitude and cooperatively realizes a same mission,
      a category of orbital planes,
      a category of each orbital plane of the orbital planes, and
      a category of an individual satellite, wherein
   the mega-constellation business device discloses all or part of the information; and
   the mega-constellation business device includes circuitry configured to control at least one of the 100 or more satellites based upon the information on the upper and lower limit values of the orbital altitude or on the nominal altitude and the altitude fluctuation width of each of the two or more categories.

9. A mega-constellation business device that is a management business device of a satellite group constituting a mega-constellation composed of 100 or more satellites, the mega-constellation business device comprising:
   the space information recorder according to claim 1,
   wherein when an intrusion by a space object, a rocket, or debris into an orbital altitude region where the mega-constellation is present is foreseen based on orbital altitude information included in the category of the satellite group, the mega-constellation business device controls a satellite included in the mega-constellation so as to avoid a collision between the satellite included in the mega-constellation and the space object, the rocket, or the debris.

10. An SSA business device that is a management business device with which a space situation awareness (SSA) business operator acquires and uses satellite information managed by a plurality of business operators, the SSA business device comprising:
   the space information recorder according to claim 1,
   wherein
   the SSA business device analyzes a possibility that a space object or debris will intrude into an orbital altitude region where a mega-constellation is present based on orbital altitude information included in the category of the satellite group, and
   when an intrusion by the space object or the debris into the orbital altitude region where the mega-constellation is present is foreseen, the SSA business device issues an intrusion alert indicating that the space object or the debris will intrude into the orbital altitude region where the mega-constellation is present.

11. A rocket launch business device that is a management business device that is used by a rocket launch business operator, the rocket launch business device comprising:
the space information recorder according to claim 1,
wherein when an intrusion by a rocket into an orbital altitude region where a mega-constellation is present is foreseen based on orbital altitude information included in the category of the satellite group, the rocket launch business device changes a rocket launch time of the rocket.

12. A satellite business device that is a management business device that is used by a satellite business operator that performs deorbit, the satellite business device comprising:
the space information recorder according to claim 1,
wherein when a passage of a deorbiting satellite through an orbital altitude region where a mega-constellation is present is foreseen based on orbital altitude information included in the category of the satellite group, the satellite business device changes a timing or speed of an orbital descent of the deorbiting satellite so as to avoid a collision between a satellite included in the mega-constellation and the deorbiting satellite.

13. A debris removal business device that is a management business device that is used by a debris removal business operator, the debris removal business device comprising:
the space information recorder according to claim 1,
wherein when a passage of a debris removal satellite through an orbital altitude region where a mega-constellation is present is foreseen based on orbital altitude information included in the category of the satellite group, the debris removal business device controls the debris removal satellite so as to avoid a collision between a satellite included in the mega-constellation and the debris removal satellite.

14. An orbital transfer business device that is a management business device that is used by a satellite business operator that performs an orbital transfer, the orbital transfer business device comprising:
the space information recorder according to claim 1,
wherein when a passage of an orbital transfer satellite through an orbital altitude region where a mega-constellation is present is foreseen based on orbital altitude information included in the category of the satellite group, the orbital transfer business device performs control to change an orbital transfer time of the orbital transfer satellite so as to avoid a collision between a satellite included in the mega-constellation and the orbital transfer satellite.

15. An open architecture data repository (OADR) that discloses orbit information of a space object, the OADR comprising:
the space information recorder according to claim 1.

16. An open architecture data repository (OADR) that discloses orbit information of a space object,
wherein the OADR provides information to and receives information from all or at least one of a mega-constellation business device that is a management business device of a satellite group constituting a mega-constellation composed of 100 or more satellites, an SSA business device that is a used by an SSA business operator, a satellite business device that is used by a satellite business operator that performs deorbit, a debris removal business device that is used by a debris removal business operator that manages a debris removal satellite, and an orbital transfer business device that is used by an orbital transfer business operator that manages a satellite that performs an orbital transfer, and
wherein the OADR instructs or requests the mega-constellation business device to execute the danger analysis method according to claim 3.

17. The OADR according to claim 15, comprising:
a database to store the orbit information of the space object; and
a space information management server to manage space information,
wherein the database includes a first database to store non-public information and a second database to store public information, and
wherein the space information management server:
performs danger analysis by referring to the first database and the second database, and
identifies and manages free public information and chargeable public information in the second database.

18. The OADR according to claim 15, comprising:
a database to store the orbit information of the space object; and
a space information management server to manage space information,
wherein the database includes a first database to store non-public information and a second database to store public information, and
wherein the space information management server:
performs danger analysis by referring to the first database and the second database, and
identifies and manages unconditional public information and conditional public information in the second database.

19. An open architecture data repository (OADR) comprising:
the space information recorder according to claim 1; and
a server,
wherein the OADR discloses orbit information of a space object,
wherein the space information recorder includes a first database to store public information and a second database to store non-public information, and
wherein the server:
acquires space object information including non-public information from all business devices or at least one business device of a space traffic management device that manages space traffic, an SSA business device that is a space situational awareness business device that monitors a space situation, a collision avoidance assistance business device that assists avoidance of a collision between space objects in space, a mega-constellation business device that manages a mega-constellation, and a debris removal business device that assists debris removal, and stores the space object information in the second database,
generates conditional information for which a disclosure recipient and disclosure content are limited and stores the conditional public information in the first database, and
transmits the conditional public information to only a specific business device among the SSA business device, the collision avoidance assistance business device, the mega-constellation business device, the debris removal business device, and a space insurance business device that handles space insurance.

20. The space information recorder according to claim 1, wherein when a change is made to an orbital altitude of each orbital plane of the satellite group constituting the mega-constellation so as to avoid the danger analyzed by the danger analysis, the circuitry is configured to record upper and lower limit values of the orbital altitude for each orbital plane after the change.

21. The mega-constellation business device according to claim 9, wherein the mega-constellation business device changes an orbital altitude of the satellite included in the mega-constellation so as to avoid the collision between the satellite included in the mega-constellation and the space object, the rocket, or the debris.

* * * * *